United States Patent
Collier, IV et al.

(10) Patent No.: US 7,258,758 B2
(45) Date of Patent: *Aug. 21, 2007

(54) STRONG HIGH LOFT LOW DENSITY NONWOVEN WEBS AND LAMINATES THEREOF

(75) Inventors: Warren L. Collier, IV, Roswell, GA (US); Christopher Dale Fenwick, Alpharetta, GA (US); Chad Michael Freese, Martinez, CA (US); Kurtis Lee Brown, Alpharetta, GA (US); Susan Elaine Shawver, Roswell, GA (US); Terry Kramer Timmons, Marietta, GA (US); James Russell Fitts, Jr., Gainesville, GA (US); Monica Graciela Varriale, Woodstock, GA (US); Alexander J. Neeb, Alpharetta, GA (US); Eric Scott Kepner, Alpharetta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 164 days.

This patent is subject to a terminal disclaimer.

(21) Appl. No.: 10/749,461

(22) Filed: Dec. 31, 2003

(65) Prior Publication Data

US 2004/0224136 A1 Nov. 11, 2004

Related U.S. Application Data

(60) Provisional application No. 60/479,638, filed on Jun. 19, 2003.

(51) Int. Cl.
*D04H 3/16* (2006.01)

(52) U.S. Cl. .................. 156/167; 156/180; 156/181; 264/210.8

(58) Field of Classification Search ............... None
See application file for complete search history.

(56) References Cited

U.S. PATENT DOCUMENTS

| 3,507,943 | A |   | 4/1970  | Such et al. |
| 3,595,731 | A | * | 7/1971  | Davies et al. ............... 428/151 |
| 3,855,046 | A |   | 12/1974 | Hansen et al. |
| D239,566  | S |   | 4/1976  | Vogt |
| 4,217,321 | A |   | 8/1980  | Campbell |

(Continued)

FOREIGN PATENT DOCUMENTS

EP 0 217 032 4/1987

(Continued)

*Primary Examiner*—Sam Chuan Yao
(74) *Attorney, Agent, or Firm*—Pauley Petersen & Erickson

(57) ABSTRACT

High loft, low density nonwoven webs suitable for use in a variety of applications requiring strong fabric layers are produced by forming substantially continuous, spunbond, crimped, bicomponent fibers of crimpable, e.g., side by side or eccentric sheath/core (A/B) configuration which are unheated prior to collection. The fibers are then heated and cooled in the absence of impeding forces to achieve maximum crimp in the Z-direction and produce a web of lofted material of greater uniformity than attained with comparable material whose fibers are drawn by a heated process. The resultant nonwoven material can then be pattern bonded or laminated for additional strength without interfering with the desired loft of the low density nonwoven. The additionally strengthened nonwoven may then be further processed such as by lamination or the like to further increase its utility.

24 Claims, 10 Drawing Sheets

U.S. PATENT DOCUMENTS

| | | | |
|---|---|---|---|
| D264,512 S | 5/1982 | Rogers | |
| 4,374,888 A | 2/1983 | Bornslaeger | |
| 4,493,868 A | 1/1985 | Meitner | |
| 4,551,378 A * | 11/1985 | Carey, Jr. | 428/198 |
| 4,590,114 A | 5/1986 | Holtman | |
| 4,663,220 A | 5/1987 | Wisneski et al. | |
| 4,692,106 A | 9/1987 | Grabowski et al. | |
| 4,704,116 A | 11/1987 | Enloe | |
| 4,795,668 A | 1/1989 | Krueger et al. | |
| 4,798,603 A | 1/1989 | Meyer et al. | |
| 4,820,459 A | 4/1989 | Reifenhauser | |
| 4,837,067 A | 6/1989 | Carey, Jr. et al. | |
| 4,851,179 A | 7/1989 | Reifenhauser | |
| 4,985,304 A | 1/1991 | Wang | |
| 5,108,820 A | 4/1992 | Kaneko et al. | |
| 5,176,668 A | 1/1993 | Bernardin | |
| 5,176,672 A | 1/1993 | Bruemmer et al. | |
| 5,192,606 A | 3/1993 | Proxmire et al. | |
| 5,226,992 A | 7/1993 | Morman | |
| 5,302,220 A | 4/1994 | Terakawa et al. | |
| 5,336,552 A | 8/1994 | Strack et al. | |
| 5,382,400 A | 1/1995 | Pike et al. | |
| 5,385,775 A | 1/1995 | Wright | |
| 5,399,219 A | 3/1995 | Roessler et al. | |
| 5,418,045 A | 5/1995 | Pike et al. | |
| 5,427,845 A | 6/1995 | Sawyer et al. | |
| 5,486,166 A | 1/1996 | Bishop et al. | |
| 5,490,846 A | 2/1996 | Ellis et al. | |
| 5,509,915 A | 4/1996 | Hanson et al. | |
| 5,522,810 A | 6/1996 | Allen, Jr. et al. | |
| 5,527,600 A | 6/1996 | Frankosky et al. | |
| 5,540,796 A | 7/1996 | Fries | |
| 5,540,976 A * | 7/1996 | Shawver et al. | 428/198 |
| 5,571,537 A | 11/1996 | Geus et al. | |
| 5,593,768 A | 1/1997 | Gessner | |
| 5,595,618 A | 1/1997 | Fries et al. | |
| 5,599,420 A * | 2/1997 | Yeo et al. | 156/290 |
| 5,622,772 A * | 4/1997 | Stokes et al. | 442/401 |
| 5,672,415 A | 9/1997 | Sawyer et al. | |
| 5,679,042 A * | 10/1997 | Varona | 442/347 |
| 5,707,468 A | 1/1998 | Arnold et al. | |
| 5,711,970 A | 1/1998 | Lau et al. | |
| 5,766,646 A | 6/1998 | Geus et al. | |
| 5,773,120 A | 6/1998 | Deka et al. | |
| 5,814,349 A | 9/1998 | Geus et al. | |
| 5,858,515 A | 1/1999 | Stokes et al. | |
| 5,874,159 A | 2/1999 | Cruise et al. | |
| 5,904,971 A | 5/1999 | Anderson et al. | |
| 5,916,678 A | 6/1999 | Jackson et al. | |
| 5,993,714 A | 11/1999 | Sawyer et al. | |
| 6,066,261 A | 5/2000 | Spickermann | |
| 6,074,869 A | 6/2000 | Pall et al. | |
| 6,080,482 A | 6/2000 | Martin et al. | |
| 6,168,849 B1 | 1/2001 | Braverman et al. | |
| 6,176,955 B1 | 1/2001 | Haynes et al. | |
| 6,203,889 B1 | 3/2001 | Quincy, III et al. | |
| 6,218,009 B1 | 4/2001 | Tsai et al. | |
| 6,261,677 B1 | 7/2001 | Tsai et al. | |
| 6,379,136 B1 * | 4/2002 | Najour et al. | 425/66 |
| 6,436,328 B1 | 8/2002 | DiPalma | |
| 6,454,989 B1 | 9/2002 | Neely et al. | |
| 6,588,080 B1 | 7/2003 | Neely et al. | |
| 6,635,136 B2 | 10/2003 | White et al. | |
| 2002/0074697 A1 | 6/2002 | Steinke et al. | |
| 2002/0089079 A1 * | 7/2002 | Shelley et al. | 264/103 |
| 2003/0118816 A1 * | 6/2003 | Polanco et al. | 428/369 |
| 2004/0077247 A1 | 4/2004 | Schmidt et al. | |
| 2005/0098256 A1 * | 5/2005 | Polanco et al. | 156/167 |

FOREIGN PATENT DOCUMENTS

| | | |
|---|---|---|
| EP | 0 586 924 A1 | 3/1994 |
| WO | WO95/16425 | 6/1995 |
| WO | WO 00/28123 | 5/2000 |
| WO | WO 00/66057 | 11/2000 |
| WO | WO 0066057 A1 * | 11/2000 |
| WO | WO 01/11119 A1 | 2/2001 |
| WO | WO 01/74281 A1 | 10/2001 |
| WO | WO 02/055779 | 7/2002 |
| WO | WO 02/057525 A2 | 7/2002 |
| WO | WO 03/056089 | 7/2003 |
| WO | WO 2004/038116 | 5/2004 |

\* cited by examiner

HEATED FDU

Tight Helical Crimp

Ambient FDU

Macroscopic Crimp

STRONG HIGH LOFT LOW DENSITY NONWOVEN WEBS AND LAMINATES THEREOF

This application claims priority from U.S. provisional application Ser. No. 60/479,638 filed 19 Jun. 2003.

BACKGROUND OF THE INVENTION

In nonwoven webs, the fibers comprising the web are generally oriented in the X-Y plane of the web and the resulting nonwoven web material is relatively thin, that is lacking in loft or significant thickness. Loft or thickness in a nonwoven web suitable for use in personal care absorbent articles promotes comfort (softness) to the user, surge management and fluid distribution to adjacent layers. In order to impart loft or thickness to a nonwoven web, it is generally desirable that at least a portion of the fibers comprising the web be oriented in the Z-direction. Conventionally, lofty nonwoven webs are produced using staple fibers. See, for example, U.S. Pat. No. 4,837,067 which teaches a nonwoven thermal insulating batt comprising structural staple fibers and bonding staple fibers which are entangled and substantially parallel to the faces of the batt at the face portions and substantially perpendicular between the faces of the batt, and U.S. Pat. No. 4,590,114 which teaches a batt including a majority of thermo-mechanical wood pulp fibers stabilized by the inclusion of a minority of thermoplastic fibers including staple length thermoplastic fibers. Alternatively, conventional high loft forming processes rely on pre-forming processes such as fiber crimp formed on a flat wire or drum, and post-forming processes such as creping or pleating of the formed web.

Others in the art have sought to provide lofty materials by first forming a standard nonwoven web, and then pleating or corrugating that web by folding the web upon itself. However, in such constructions the fibers of the web still remain in the plane of the web, it is only the plane of the web itself which has been distorted.

Inventions related hereto by the fact that the fibers have true Z-direction orientation outside of the plane of the web, such as U.S. Pat. No. 6,588,080, may generally be characterized as forming a lofty material which has folds induced in the base material fibers, producing Z-direction fibers through the use of a transfer process between differential speed forming surfaces.

However, there exists a need in the art for alternative high loft, low density fabrics which may exhibit a good balance of fluid control having fast intake, low flow back and high horizontal distribution, as well as good web morphology, and the other above-mentioned properties including softness, and the like. There is a further desire for lofty low density nonwoven webs that exhibit a strength capable of allowing such a web to be further processed or to function in a variety of applications in absorbent garments including where such webs are laminated to other layers of material.

SUMMARY OF THE INVENTION

In response to the above-described needs in the art, the present invention can utilize the natural crimping ability of certain bicomponent, substantially continuous, thermoplastic fibers of A/B configuration, i.e., generally side by side or eccentric sheath/core, construction to produce high loft, low density nonwoven webs. While this class of fiber types is known in the art, per se, special processing parameters are applied by the present invention to derive precursor filaments suitable for processing into high loft, low density fabrics. The fibers are then crimped into high loft, low density fabrics by novel techniques applied after filament formation. Additionally, methods were developed to ensure the stability of the resultant high loft, low density fabrics after the filaments have been crimped.

Laminates of the lofty low density fabric may be manufactured and used, for example in absorbent garment applications such as liners, fluid transfer layers, absorbent core wraps, and components of outer covers, dependent upon the type of material or materials laminated to the lofty low density fabric. The laminates may thus be given appropriate functionalities for their intended layers within the garment, such as breathability, fluid barrier properties, extensibility or elasticity in one or more axes, or combinations thereof, while retaining the benefits of the lofty low density fabric.

In one aspect of the invention, the new fabrics may comprise a high loft, low density nonwoven web having a web of substantially continuous, spunbond, helically crimped, bicomponent fibers of A/B configuration. Within the web the fibers are randomly crimped to produce a lofted material with heterogeneous, random, fiber orientation, including heterogeneous Z-direction orientation to produce loft of the web, and uniformity of fiber distribution throughout the web resulting in a uniform fabric with less fiber clumping. This uniformity may give the web, e.g., faster fluid uptake rates, with more consistent performance, allowing a garment designer to achieve greater control in the performance of the garment. By way of illustration, lofty webs of the present invention may have a basis weight from about 0.3 osy to 25 osy exhibiting densities from about 0.002 g/cc to 0.05 g/cc and lofts from 0.02 inches to 1.5 inches. For example, a 0.5 osy web may exhibit loft from about 0.03 inches to 0.3 inches at a density range of 0.022 to 0.002 g/cc. As another example, a 3.0 osy web may exhibit loft from 0.1 inches to 1.5 inches at a density range of 0.04 to 0.003 g/cc.

Uniformity of the webs of the present invention may be measured by a formation index value derived from a commercially available MK Formation Analyzer model 960, from MK Systems Inc. of Danvers, Massachusetts, as set forth in greater detail below. A nonwoven material according to certain aspects of the present invention may comprise a web of substantially continuous A/B bicomponent crimped fibers with the web having a percentage difference between a formation index of a top side of the web, i.e., the major plane surface of the web not in contact with the forming surface, also called a forming wire, and a formation index of a wire side of the web, i.e., the major plane surface of the web which is in contact with the forming wire, of less than about 11%. The web may subsequently be pattern bonded.

Improvements in formation (or sheet uniformity), as measured by formation index values, have been known to improve fabric strength and thus the performance of the fabric in its conversion or incorporation into absorbent articles. Formation index values, however, being based on light transmission/reflectance of the webs, should not be used as a comparison between different grades of nonwoven webs, e.g., different colors, basis weights, $TiO_2$ contents, or the like; which may affect light transmission/reflectance of the webs. Therefore, in characterizing the present invention care must be taken and overall ranges and values of the formation index values may be stated in the alternative and related closely to the morphological characteristics and the surface of the nonwoven web that is being measured.

For example, in some aspects of the present invention, the nonwoven materials may have a formation index averaging above about 37.6 on the top side of the web when the web has a bulk to about 0.1 inches in the Z axis, or a formation index averaging above about 32.03 on the top side of the web when the web has a bulk of over about 0.1 inches in the Z axis. In other aspects of the present invention the nonwoven materials may have a formation index averaging above about 43.76 on the wire side of the web when the web has a bulk to about 0.1 inches in the Z axis or a formation index averaging above about 37.09 on the wire side of the web when the web has a bulk of over about 0.1 inches in the Z axis.

In some aspects of the present invention, the nonwoven materials may have a formation index averaging above about 37.6 on the top side of the web when the web has a basis weight of up to 1.5 osy, or a formation index averaging above about 32.03 on the top side of the web when the web has a basis weight of over about 1.5 osy. In other aspects of the present invention, the nonwoven materials may have a formation index averaging above about 43.76 on the wire side of the web when the web has a basis weight of up to 1.5 osy, or a formation index averaging above about 37.09 on the wire side of the web when the web has a basis weight of over about 1.5 osy.

In some aspects of the present invention, the nonwoven materials may have a formation index averaging above about 19.07 on the top side of the web when the web has a bulk of about 0.35 inches in the Z axis, or a formation index averaging above about 32.03 on the top side of the web when the web has a bulk of about 0.12 inches in the Z axis, or a formation index averaging above about 28.73 on the top side of the web when the web has a bulk of about 0.1 inches in the Z axis, or a formation index averaging above about 34.63 on the top side of the web when the web has a bulk of about 0.08 inches in the Z axis, or a formation index averaging above about 37.6 on the top side of the web when the web has a bulk of about 0.07 inches in the Z axis.

In some aspects of the present invention, the nonwoven materials may have a formation index averaging above about 31.6 on the wire side of the web when the web has a bulk of about 0.35 inches in the Z axis, or a formation index averaging above about 37.09 on the wire side of the web when the web has a bulk of about 0.12 inches in the Z axis, or a formation index averaging above about 35.37 on the wire side of the web when the web has a bulk of about 0.1 inches in the Z axis, or a formation index averaging above about 38.98 on the wire side of the web when the web has a bulk of about 0.08 inches in the Z axis, or a formation index averaging above about 43.76 on the wire side of the web when the web has a bulk of about 0.07 inches in the Z axis.

In some aspects of the present invention, the nonwoven materials may have a formation index averaging above about 19.07 on the top side of a web having a basis weight of about 6.0 osy, or a formation index averaging above about 32.03 on the top side of a web having a basis weight of about 2.5 osy, or a formation index averaging above about 30.27 on the top side of a web having a basis weight of about 2.25 osy, or a formation index averaging above about 28.73 on the top side of a web having a basis weight of about 1.5 osy, or a formation index averaging above about 31.07 on the top side of a web having a basis weight of about 1.2 osy, or a formation index averaging above about 34.63 on the top side of a web having a basis weight of about 1.0 osy, or a formation index averaging above about 37.6 on the top side of a web having a basis weight of about 0.75 osy.

In some aspects of the present invention, the nonwoven materials may have a formation index averaging above about 31.6 on the wire side of a web which has a basis weight of about 6.0 osy, or a formation index averaging above about 35.03 on the wire side of a web which has a basis weight of about 2.25 osy, or a formation index averaging above about 37.09 on the wire side of a web which has a basis weight of about 2.5 osy, or a formation index averaging above about 35.37 on the wire side of a web which has a basis weight of about 1.5 osy, or a formation index averaging above about 37.15 on the wire side of a web which has a basis weight of about 1.2 osy, or a formation index averaging above about 38.98 on the wire side of a web which has a basis weight of about 1.0 osy, or a formation index averaging above about 43.76 on the wire side of a web which has a basis weight of about 0.75 osy.

In some aspects of the present invention, the nonwoven materials may have fibers having a fiber denier of between about 0.1 dpf to about 9.0 dpf, or between about 0.1 dpf to about 6.0 dpf, or between about 0.1 dpf to about 5.0 dpf, or between about 0.1 dpf to about 4.2 dpf or between about 0.1 dpf to about 3.3 dpf, or between about 3.4 dpf to about 4.2 dpf. The fibers may have a substantially white color which may include a $TiO_2$ percentage of about 0.1% to about 5% or a $TiO_2$ percentage of about 2%.

In some aspects of the present invention, the nonwoven materials may have the fibers of the nonwoven web integrally bonded. In some aspects of the present invention, the nonwoven materials may have a web of substantially continuous A/B bicomponent crimped fibers with the web having a formation index averaging above about 37.6 on the top side of the web when the web has a bulk to about 0.1 inches in the Z axis, or a formation index averaging above about 32.03 on the top side of the web when the web has a bulk of over about 0.1 inches in the Z axis; and the web may subsequently be pattern bonded.

In some aspects of the present invention, the nonwoven materials may have a web of substantially continuous A/B bicomponent crimped fibers with the web having a formation index averaging above about 43.76 on the wire side of the web when the web has a bulk to about 0.1 inches in the Z axis, or a formation index averaging above about 37.09 on the wire side of the web when the web has a bulk of over about 0.1 inches in the Z axis; and the web may subsequently be pattern bonded.

The present invention may encompass a high loft, low density nonwoven web made according to the various inventive methods disclosed herein and further contemplates combination absorbent core wrap/spacer layer/surge materials for an absorbent garment, liners for an absorbent garment, and facing materials for outer covers for an absorbent garment, all or any of which may comprise nonwoven webs made according to such methods.

In another aspect, the new fabrics may comprise a high loft, low density nonwoven web made from highly machine direction oriented substantially continuous, spunbond, helically crimped, bicomponent fibers of A/B configuration. Within the web the fibers are randomly crimped to produce a lofted material with a very high loft by inducing shingled layers with a buckled Z-direction orientation to produce loft of the web, and uniform fiber distribution throughout the web.

The methodology for making high loft, low density nonwoven webs according to the present invention may include initially producing the bicomponent filaments without heat before collection of the filaments, e.g., by using an unheated fiber draw unit (FDU) rather than using the heated FDUs prevalent in the art. The present invention is not limited to those fibers formed with an FDU. Other fiber forming apparatus, e.g., such as those described in U.S. Pat. No.

4,692,106 to Grabowski et al. or U.S. Pat. Nos. 4,820,459 and 4,851,179, both to Reifenhauser, may be used, or those described in U.S. Pat. Nos. 5,814,349; 5,766,646, and 5,571,537; all of which are incorporated by reference in their entirety. The fibers are then collected on the forming surface and heated.to relax, i.e., relieve the forces restraining the inherent molecular orientation present in, the bicomponent fiber structure and initiate crimping. Immediately after this heating the web is cooled so that the fibers do not bond, thereby maintaining the mobility of the fibers and allowing the fibers to crimp to the desired extent. Other processing parameters such as wire vacuum may be controlled to further allow the fibers to crimp unimpeded. Upon crimping, a high loft, low density fabric is created. Additional heating is then applied to set the web. Processing parameters can be controlled in the final heating phase to maintain the web in the original high loft, low density state or the parameters may be controlled to adjust the density and loft of the web during this phase.

In yet another aspect of the present invention, the high loft, low density nonwoven webs are further subjected to a bonding process, such as a pattern bonding, to allow their placement in applications where a greater material strength or integrity is required from the lofty nonwoven layer. In some aspects of the invention, some high loft, low density nonwoven webs of such low basis weights, e.g. between 1.5 osy (50 gsm) and 0.6 osy (20 gsm), or lower, as to be too unstable for certain further processing (such as transfer between two moving forming surfaces) may further need to be stabilized or otherwise made transportable prior to pattern bonding as a matter of practical necessity to allow them to reach the bonding mechanism, or in order to provide additional integrity to the web to avoid piling, separations, or tearing of the web. Ultrasonic bonding processes or pattern bonding processes, and particularly thermal point bonding processes which yield a low bond point density, may be utilized to increase the strength of materials of the present invention without undue sacrifice of the loft properties (both aesthetic and functional) desired of such materials. In addition, a nonwoven web made according to the present invention may be integrally bonded, such as by the application of heat at or above the softening or melting point of one of the bicomponent polymers to bond contacting fibers to each other. Applications of the bonded materials according to these aspects of the present invention may include, without limitation, a combined surge/spacer/absorbent core-wrap layer, an outer cover facing material, or an inner liner for an absorbent article, such as a diaper, as will be recognized by those in the art upon an understanding of the present invention. In addition to adding strength, bonding may further lock down loose, substantially continuous, fibers which might unravel and cause skin irritation, further helping the nonwoven retain a soft, cloth-like, feel.

According to additional aspects of the present invention, the single layer web which has been bonded for increased strength may be suitably worked by other processes including laminations or other processes which might not be utilized with unbonded webs of less strength. Such laminates may particularly be utilized to obtain breathable liquid-barrier layers having a soft cloth-like feel for use in garment outer covers and the like. Other laminates may additionally be provided with desirable stretch and retraction characteristics for improved fit and conformance to the wearer.

The lamination processes may include a vertical filament laminate process, such as for making vertical filament stretch-bonded laminate material, as disclosed in copending application U.S. patent publication No. 2002-0104608, or a horizontal/continuous filament laminate manufacturing process, such as for making continuous filament stretch-bonded laminate material, as disclosed in U.S. Pat. No. 5,385,775 to Wright; all of which are incorporated by reference herein in their entirety.

BRIEF DESCRIPTION OF THE DRAWINGS

These and other objects and features of this invention will be better understood from the following detailed description taken in conjunction with the drawings wherein.

DEFINITIONS

Figure 1:
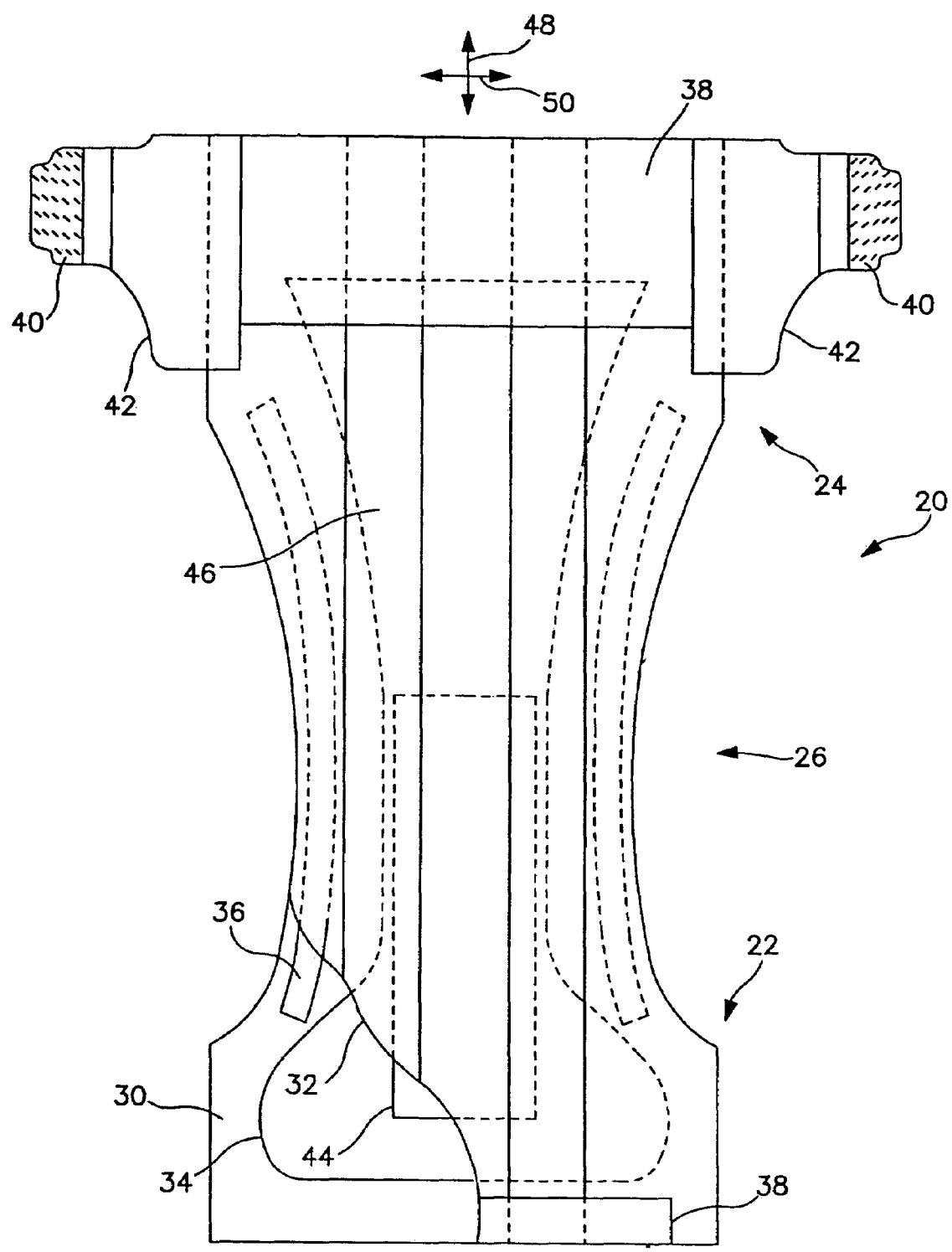
FIG. 1 illustrates a laid flat diaper having aspects of the present invention.

The terms "breathable film," "breathable laminate" or "breathable outer cover material" refer to a film, laminate, or outer cover material having a water vapor transmission rate ("WVTR") of at least about 300 grams/m$^2$-24 hours, using the WVTR Test Procedure described herein. Breathable materials typically rely on molecular diffusion of vapor, or vapor passage through micropores, and are substantially liquid impermeable.

The terms "extendible" and "expandable" are used interchangeably herein to mean a material which upon application of a stretching force, can be extended in a particular direction (e.g., the cross-direction), to a stretched dimension (e.g., width) which is at least 25% greater than an original, unstretched dimension. When the stretching force is removed after a one-minute holding period, the material preferably does not retract, or retracts by not more than 30% of the difference between the stretched dimension and the original dimension. Thus, a material having a width of one meter, which is extendible in the cross direction, can be stretched to a width of at least 1.25 meters. When the stretching force is released, after holding the extended width for one minute, a material stretched to a width of 1.25 meters will preferably not retract, or will retract to a width of not less than 1.175 meters. Extendible materials are different from elastic materials. "Elastic materials" tend to retract with force towards their original dimension when a stretching force is released. The stretching force can be any force sufficient to extend the material to between 125% of its original dimension, and its maximum stretched dimension in the selected direction (e.g., the cross direction) without rupturing it.

The term "film" refers to a nonfibrous sheet made using a film extrusion process, such as a cast film or blown film extrusion process. This term includes apertured films and films rendered microporous by mixing polymer with filler, forming a film from the mixture, and stretching the film.

"Forming surface" refers to a surface for the collection of extruded. or natural materials and may include foraminous wires, or collecting wires, or rotating collection drums, as known in the art as well as other surfaces.

"Formation index" refers to the M/K test formation index value as set forth herein and is a measurement of uniformity of web formation. The index value is the quotient of the number of pixels in the modal (most common) weight class of pixel light divided by the total number of weight classes observed, divided by a factor of 100 for normalization. The higher the M/K formation index, the better the formation uniformity. A formation index value can vary dependent upon the surface of the web measured. Hence, "top side" and "bottom side," also sometimes called "wire side," refer to the two major surfaces of the web in the x-y plane and are denominated according to the proximity of the surfaces to the forming surface.

"Functionally bonded" refers to a bonding sufficient to bond fibers into a web of sufficient strength to be manipulated between two moving forming surfaces. "Nonfunctionally bonded" refers to a bonding sufficient only to hold the fibers of a web, or the precursor to a web, in place for processing according to the method herein but so light as to not hold the fibers together were they to be manipulated between two moving forming surfaces.

"Integrally bonded" as used herein refers to the pattern bonding of a layer of material without adhering the subject web to additional webs.

A "layer" is defined as a generally recognizable combination of similar material types or function existing in the X-Y plane.

A "laminate" refers to two or more layers joined together to have a substantial portion of their common X-Y plane interfacing so as to promote a shared functionality or functionalities.

As used herein, the term "machine direction" or MD means the length of a fabric in the direction in which it is produced. The term "cross machine direction" or CD means the width of fabric, i.e. a direction generally perpendicular to the MD.

The term "microporous" refers to films having voids separated by thin polymer membranes and films having micropores passing through the films. The voids or micropores can be formed when a mixture of polymer and filler is extruded into a film and the film is stretched, preferably uniaxially in the machine direction. Microporous films tend to have water vapor transmission due to molecular diffusion of water vapor through the membranes or micropores, but substantially block the passage of aqueous liquids.

"Neck-bonded laminate" and "stretch-bonded laminate" refer to elastomeric laminate materials. The methods of making such materials are well known to those skilled in the art and are described in U.S. Pat. No. 4,663,220 to Wisneski et al., U.S. Pat. No. 5,226,992 to Morman, and European Patent Application No. EP 0 217 032 in the names of Taylor et al.; all of which are incorporated herein by reference in their entirety.

As used herein, the terms "nonwoven", "nonwoven web", or "nonwoven material" means a web having a structure of individual fibers, filaments or threads which are interlaid, but not in a regular or identifiable manner such as those in a knitted fabric or films that have been fibrillated. Nonwoven webs or materials have been formed from many processes such as, for example, meltblowing processes, spunbonding processes, and bonded carded web processes. The basis weight of nonwoven webs or materials is usually expressed in ounces of material per square yard (osy) or grams per square meter (gsm), and the fiber diameters are usually expressed in microns. (Note that to convert from osy to gsm, multiply osy by 33.91.)

"Particle," "particles," "particulate," "particulates" and the like, refer to a material that is generally in the form of discrete units. The particles can include granules, pulverulents, powders or spheres. Thus, the particles can have any desired shape such as, for example, cubic, rod-like, polyhedral, spherical or semi-spherical, rounded or semi-rounded, angular, irregular, etc. Shapes having a large greatest dimension/smallest dimension ratio, like needles, flakes and fibers, are also contemplated for use herein. The use of "particle" or "particulate" may also describe an agglomeration including more than one particle, particulate or the like.

As used herein, the term "pattern bonded" refers to a process of bonding a nonwoven web in a pattern by the application of heat and pressure or other methods, such as ultrasonic bonding. Thermal pattern bonding typically is carried out for polyolefins at a temperature in a range of from about 80° C. to about 180° C. and a pressure in a range of from about 150 to about 1,000 pounds per linear inch (59-178 kg/cm). The pattern employed typically will have from about 10 to about 250 bonds/inch$^2$ (1-40 bonds/cm$^2$) covering from about 5 to about 30 percent of the surface area. Such pattern bonding may be accomplished in accordance with known procedures. See, for example, U.S. Design Pat. No. 239,566 to Vogt, U.S. Design Pat. No. 264,512 to Rogers, U.S. Pat. No. 3,855,046 to Hansen et al., and U.S. Pat. No. 4,493,868 to Meitner et al. and U.S. Pat. No. 5,858,515 to Stokes et al., for illustrations of bonding patterns and a discussion of bonding procedures, which patents are incorporated herein by reference in their entirety. Ultrasonic bonding is performed, for example, by passing the multilayer nonwoven web laminate between a sonic horn and anvil roll as illustrated in U.S. Pat. No. 4,374,888 to Bornslaeger, which is hereby incorporated by reference in its entirety.

"Point bonding" refers to compressing a thermoplastic web between two opposed rollers, at least one of which has a raised point, i.e., a discontinuous surface area, which is heated.

"Shingled," "shingling," or a "shingled layer," refers to an effect wherein a nonwoven web may be layered on itself owing to the overlap of fiber deposition on the forming surface as the jet of fibers coming from the die head oscillates back and forth over the moving collection wire resulting in the laying down of overlapping rows in the manner of shingles. Z-direction buckling may occur where the oscillations of fiber collection result in a Z-direction accumulation of the fibers which then fall towards the X-Y plane of the web resulting in the described shingling. The shingling and buckling thereof may be substantially irregular or random in nature but provide a higher loft and greater open space within the web.

As used herein "side by side fibers," and "eccentric sheath/core fibers" belong to the class of crimpable A/B bicomponent or conjugate fibers. The term "bicomponent fibers" refers to fibers which have been formed from at least two polymers extruded from separate extruders but spun together to form one fiber. Bicomponent fibers are also sometimes referred to as conjugate fibers or multicomponent fibers. Bicomponent fibers are taught, e.g., by U.S. Pat. No. 5,382,400 to Pike et al., which is hereby incorporated by reference in its entirety. The polymers of conjugate fibers are usually different from each other though some conjugate fibers may be monocomponent fibers. Conjugate fibers are taught in U.S. Pat. No. 5,108,820 to Kaneko et al., U.S. Pat. No. 4,795,668 to Krueger et al. and U.S. Pat. No. 5,336,552 to Strack et al., each of which is hereby incorporated by reference in its entirety. A/B conjugate fibers may be used to produce crimp in the fibers by using the differential rates of expansion and contraction of the two (or more) polymers.

"Spiral bond" refers to any method of pattern bonding whereby two raised-pattern calender rolls are used in opposition to create the pattern bond on a web. Once such spiral bond pattern is described in U.S. Pat. No. 3,507,943 to Such et al. which is hereby incorporated by reference in its entirety As used herein, the term "substantially continuous fibers" refers to fibers which are not cut from their original length prior to being formed into a nonwoven web or fabric. Substantially continuous fibers may have average lengths ranging from greater than about 15 centimeters to more than one meter, and up to the length of the web or fabric being formed. The definition of "substantially continuous fibers" includes fibers which are not cut prior to being formed into a nonwoven web or fabric, but which are later cut when the nonwoven web or fabric is cut, and fibers which are substantially linear or crimped. Fiber diameter can be measured in microns ($\mu$m). Another frequently used expression of fiber diameter is denier, which is defined as grams per 9000 meters of a fiber and may be calculated as fiber diameter in microns ($\mu$m) squared, multiplied by the polymer density in grams/cc, multiplied by 0.00707. A lower denier indicates a finer fiber and a higher denier indicates a thicker or heavier fiber. For example, the diameter of a polypropylene fiber given as 15 microns ($\mu$m) may be converted to denier by squaring, multiplying the result by 0.89 g/cc and multiplying by 0.00707. Thus, a 15 micron ($\mu$m) polypropylene fiber has a denier of about 1.42 ($15^2 \times 0.89 \times 0.00707 = 1.415$). Outside the United States the unit of measurement is more commonly the "tex", which is defined as the grams per kilometer of fiber. Tex may be calculated as denier/9.

As used herein, the term "through-air bonding" or "TAB" refers to any process of integrally bonding a nonwoven by adhering the fibers of the web to each other, for example a bicomponent fiber web, in which air which is sufficiently hot to melt one of the polymers of which the fibers of the web are made is forced through the web.

Words of degree, such as "about", "substantially", and the like are used herein in the sense of "at, or nearly at, when given the manufacturing, design, material and testing tolerances inherent in the stated circumstances" and are used to prevent the unscrupulous infringer from unfairly taking advantage of the invention disclosure where exact or absolute figures are stated as an aid to understanding the invention.

As used herein, the term "Z-direction" refers to fibers disposed outside of the plane of orientation of a web. A web will be considered to have an X-axis in the machine direction, a Y-axis in the cross machine direction and a Z-axis in the loft, bulk, or thickness direction, with its major planes, or surfaces, lying parallel with the X-Y plane. The term "as formed Z-direction fibers" may be used herein to refer to fibers that become oriented in the Z-direction during forming of the nonwoven web as distinguished from fibers having a Z-direction component resulting from post-forming processing of the nonwoven web, such as in the case of mechanically crimped or creped or otherwise disrupted nonwoven webs.

DESCRIPTION OF PREFERRED EMBODIMENTS

This invention relates to a high loft, low density nonwoven material produced from continuous fibers in which the lofty character of the nonwoven material is the result of the fibers comprising the web having a Z-direction orientation, resulting from improved processing and the resultant crimping. The lofty low density nonwoven is then pattern bonded or laminated, or both, for increased strength and functionality. These materials are particularly suitable for use in a broad range of applications including, without limitation, material layers for personal care products.

The various aspects and embodiments of the invention will be described in the context of disposable absorbent articles, and more particularly referred to, without limitation and by way of illustration only, as a disposable diaper. It is, however, readily apparent that the present invention could also be employed to produce other garments, such as feminine care articles, various incontinence garments, medical garments and any other disposable garments, whether absorbent or not, needing an easily manufactured elasticized area around an opening in the garment. Typically, the disposable garments are intended for limited use and are not intended to be laundered or otherwise cleaned for reuse. A disposable diaper, for example, is discarded after it has become soiled by the wearer.

FIG. 1 is a representative plan view of an absorbent article, such as disposable diaper 20, in its flat-out, or unfolded state. Portions of the structure are partially cut away to more clearly show the interior construction of diaper 20. The surface of the diaper 20 which contacts the wearer is facing the viewer.

With reference to FIG. 1, the disposable diaper 20 generally defines a front waist section 22, a rear waist section 24, and an intermediate section 26 which interconnects the front and rear waist sections. The front and rear waist sections 22 and 24 include the general portions of the diaper which are constructed to extend substantially over the wearer's front and rear abdominal regions, respectively, during use. The intermediate section 26 of the diaper includes the general portion of the diaper that is constructed to extend through the wearer's crotch region between the legs. Thus, the intermediate section 26 is an area where repeated liquid surges typically occur in the diaper.

The diaper 20 includes, without limitation, an outer cover, or backsheet 30, a liquid permeable bodyside liner, or topsheet, 32 positioned in facing relation with the backsheet 30, and an absorbent core body, or liquid retention structure, 34, such as an absorbent pad, which is located between the backsheet 30 and the topsheet 32. The backsheet 30 defines a length, or longitudinal direction 48, and a width, or lateral direction 50 which, in the illustrated embodiment, coincide with the length and width of the diaper 20. The liquid retention structure 34 generally has a length and width that are less than the length and width of the backsheet 30, respectively. Thus, marginal portions of the diaper 20, such as marginal sections of the backsheet 30, may extend past the terminal edges of the liquid retention structure 34. In the illustrated embodiments, for example, the backsheet 30 extends outwardly beyond the terminal marginal edges of the liquid retention structure 34 to form side margins and end margins of the diaper 20. The topsheet 32 is generally coextensive with the backsheet 30 but may optionally cover an area which is larger or smaller than the area of the backsheet 30, as desired.

To provide improved fit and to help reduce leakage of body exudates from the diaper 20, the diaper side margins and end margins may be elasticized with suitable elastic members, as further explained below. For example, as representatively illustrated in FIG. 1, the diaper 20 may include leg elastics 36 which are constructed to operably tension the side margins of the diaper 20 to provide elasticized leg bands which can closely fit around the legs of the wearer to reduce leakage and provide improved comfort and appearance. Waist elastics 38 are employed to elasticize the end margins of the diaper 20 to provide elasticized waistbands. The waist elastics 38 are configured to provide a resilient, comfortably close fit around the waist of the wearer.

Materials suitable for use as the leg elastics 36 and waist elastics 38 are well known to those skilled in the art. Exemplary of such materials are sheets or strands or ribbons of a polymeric, elastomeric material which are adhered to the backsheet, such that elastic constrictive forces are imparted to the backsheet 30. The elastics may also include such materials as polyurethane, synthetic and natural rubber that may optionally be heat shrinkable or heat elasticizable. Many variants of elastomeric materials suitable for use with the present invention will occur to the person having ordinary skill in the art upon gaining an understanding of the invention as presented herein.

As is known, fastening means, such as hook and loop fasteners, may be employed to secure the diaper 20 on a wearer. Alternatively, other fastening means, such as buttons, pins, snaps, adhesive tape fasteners, cohesives, fabric-and-loop fasteners, or the like, may be employed. In the illustrated embodiment, the diaper 20 includes a pair of side panels 42 to which the fasteners 40, indicated as the hook portion of a hook and loop fastener, are attached. Generally, the side panels 42 are attached to the side edges of the diaper 20 in one of the waist sections 22, 24 and extend laterally outward therefrom. The side panels 42 may be elasticized or otherwise rendered elastomeric. For example, the side panels 42, or indeed, any precursor webs of the garment, may be an elastomeric material such as, e.g., a neck-bonded laminate or stretch-bonded laminate material. Methods of making such materials are well known to those skilled in the art and are described in U.S. Pat. No. 4,663,220 to Wisneski et al., U.S. Pat. No. 5,226,992 to Morman, and European Patent Application No. EP 0 217 032 in the names of Taylor et al. Examples of absorbent articles that include elasticized side panels and selectively configured fastener tabs are described in PCT patent application No. WO 95/16425 to Roessler; U.S. Pat. No. 5,399,219 to Roessler et al.; U.S. Pat. No. 5,540,796 to Fries; and U.S. Pat. No. 5,595,618 to Fries each of which is hereby incorporated by reference in its entirety.

The diaper 20 may also include a surge management layer 44, located between the topsheet 32 and the liquid retention structure 34, to rapidly accept fluid exudates and distribute the fluid exudates to the liquid retention structure 34 within the diaper 20. The diaper 20 may further include a ventilation layer (not illustrated), also called a spacer, or spacer layer, located between the liquid retention structure 34 and the backsheet 30 to insulate the backsheet 30 from the liquid retention structure 34 to reduce the dampness of the garment at the exterior surface of a breathable outer cover, or backsheet, 30. Examples of suitable surge management layers 44 are described in U.S. Pat. No. 5,486,166 to Bishop and U.S. Pat. No. 5,490,846 to Ellis.

As representatively illustrated in FIG. 1, the disposable diaper 20 may also include a pair of containment flaps 46 which are configured to provide a barrier to the lateral flow of body exudates. The containment flaps 46 may be located along the laterally opposed side edges of the diaper 20 adjacent the side edges of the liquid retention structure 34. Each containment flap 46 typically defines an unattached edge which is configured to maintain an upright, perpendicular configuration in at least the intermediate section 26 of the diaper 20 to form a seal against the wearer's body. The containment flaps 46 may extend longitudinally along the entire length of the liquid retention structure 34 or may only extend partially along the length of the liquid retention structure 34. When the containment flaps 46 are shorter in length than the liquid retention structure 34, the containment flaps 46 can be selectively positioned anywhere along the side edges of the diaper 20 in the intermediate section 26. Such containment flaps 46 are generally well known to those skilled in the art. For example, suitable constructions and arrangements for containment flaps 46 are described in U.S. Pat. No. 4,704,116 issued Nov. 3, 1987 to K. Enloe.

A The diaper 20 may be of various suitable shapes. For example, the diaper may have an overall rectangular shape, T-shape or an approximately hour-glass shape. In the shown embodiment, the diaper 20 has a generally I-shape. The diaper 20 further has a longitudinal direction 48, and a lateral direction 50. Other suitable components which may be incorporated on absorbent articles of the present invention may include waist flaps and the like which are generally known to those skilled in the art. Examples of diaper configurations suitable for use in connection with the instant invention which may include other components suitable for use on diapers are described in U.S. Pat. No. 4,798,603 to Meyer et al.; U.S. Pat. No. 5,176,668 to Bernardin; U.S. Pat. No. 5,176,672 to Bruemmer et al.; U.S. Pat. No. 5,192,606 to Proxmire et al. and U.S. Pat. No. 5,509,915 to Hanson et al. each of which is hereby incorporated by reference in its entirety.

The various components of the diaper 20 are assembled together employing various types of suitable attachment means, such as adhesive, ultrasonic bonds, thermal bonds or combinations thereof. In the shown embodiment, for example, the topsheet 32 and backsheet 30 may be assembled to each other and to the liquid retention structure 34 with lines of adhesive, such as a hot melt, pressure-sensitive adhesive. Similarly, other diaper components, such as the elastic members 36 and 38, fastening members 40, and surge layer 44 may be assembled into the article by employing the above-identified attachment mechanisms.

Figure 2:
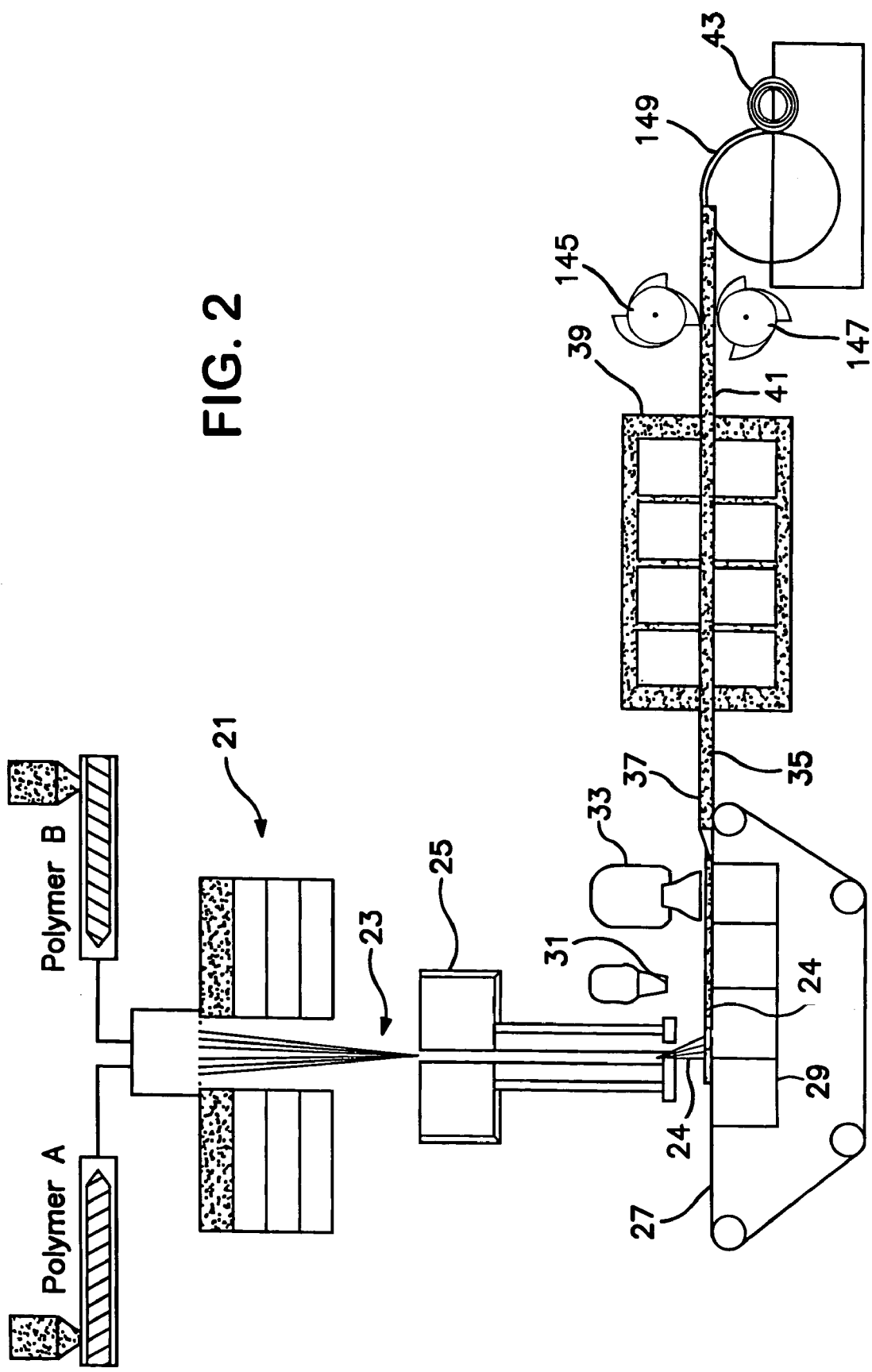
FIG. 2 illustrates a process and apparatus for producing a lofty, nonwoven material in accordance with one embodiment of this invention.

FIG. 2 is a schematic diagram illustrating exemplary methods and apparatus of this invention for producing high loft, low density materials by producing crimpable bicomponent side by side substantially continuous fibers and causing them to crimp in an unrestrained environment. As shown in FIG. 2, two polymers A and B are spun with known thermoplastic fiber spinning apparatus 21 to form bicomponent side by side, or A/B, polymer masses 23. The polymer masses 23 are then traversed through a fiber draw unit (FDU) 25 to form fibers 24. According to one embodiment of the present invention, unlike the standard practice in the art, the FDU is not heated, but is left at ambient temperature (e.g., 65° F.). Thus, while the polymers will be recognized as having been heated to extrude the polymer masses, the actual fibers, as formed in the ambient temperature FDU, will be referred to and understood herein as having been deposited onto a forming surface without the addition of heat to the fibers before deposition. The fibers 24 are left in a substantially continuous state and are deposited on a moving forming wire or surface 27. Deposition of the fibers 24 is aided by an under-wire vacuum supplied by a negative air pressure unit, or below wire exhaust, 29.

The fibers 24 are then heated by traversal under one of a hot air knife (HAK) 31 or hot air diffuser 33, which are both shown in the figure but will be appreciated to be used in the alternative under normal circumstances. A conventional hot air knife includes a mandrel with a slot that blows a jet of hot air onto the nonwoven web surface. Such hot air knives are taught, for example, by U.S. Pat. No. 5,707,468 to Arnold, et al., which is hereby incorporated by reference in its entirety. The hot air diffuser 33 is an alternative which operates in a similar manner but with lower air velocity over a greater surface area and thus uses correspondingly lower air temperatures. The group, or layer, of fibers may receive an external skin melting or softening and a small degree of nonfunctional bonding during this traversal through the first heating zone. "Nonfunctionally bonded" is a bonding sufficient only to hold the fibers in place for processing according to the method herein but so light as to not hold the fibers together were they to be manipulated manually. Such bonding may be incidental or eliminated altogether if desirable.

The fibers are then passed out of the first heating zone of the hot air knife 31 or hot air diffuser 33 to a second wire 35 where the fibers continue to cool and where the below wire exhaust 29 is removed so as to not disrupt crimping. As the fibers cool they will crimp in the Z-direction, or out of the plane of the web, and form a high loft, low density nonwoven web 37. The web 37 may then be transported to a through air bonding (TAB) unit 39 to set, or fix, the web at a desired degree of loft and density so as to stabilize the web for further use or processing, as for example, to impart sufficient integrity to the web 37 to allow a very low degree of pattern bonding, as discussed below, while still enabling such a stabilized and pattern bonded, high loft, low density web to be utilized in various functional layers in an absorbent garment. Alternatively, the through air bonding (TAB) unit 39 can be zoned to provide a first heating zone in place of the hot air knife 31 or hot air diffuser 33, followed by a cooling zone, which is in turn followed by a second heating zone sufficient to fix the web.

Figure 3:
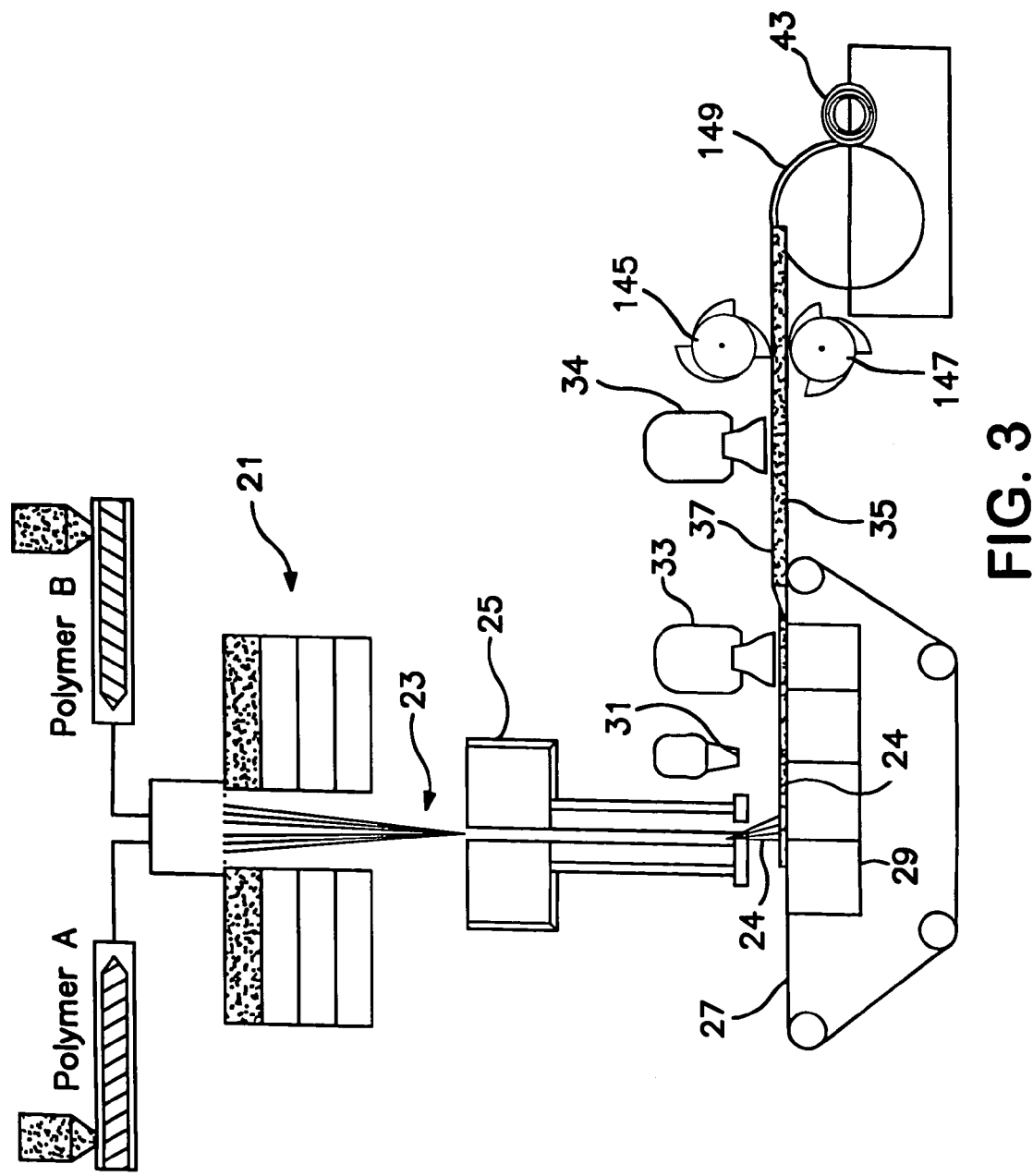
FIG. 3 illustrates an alternative process and apparatus to that of FIG. 1 for producing a lofty, nonwoven material in accordance with one embodiment of this invention.

Referencing FIG. 3, in another alternative, a second application of heated air sufficient to functionally bond and stabilize the lofted web may be applied by a downstream hot air diffuser 34, in place of the TAB unit 39. In another alternative, a transportation sheet, e.g., such as another web (not shown), may be formed or placed on the forming surface 27 and heat stabilized upstream of the fiber 24 deposition, and consequently underneath the lofted web layer 37, to enable lofted web transport through the pattern bonding processes where necessary or desired. The fixed, i.e. stable, web 41 is then further pattern bonded, such as by a thermal bond, illustrated as a point bonding process where the fixed web 41 is passed between two heated calender rolls 145, 147 of desired pattern as will be understood by those in the art.

Figure 10:
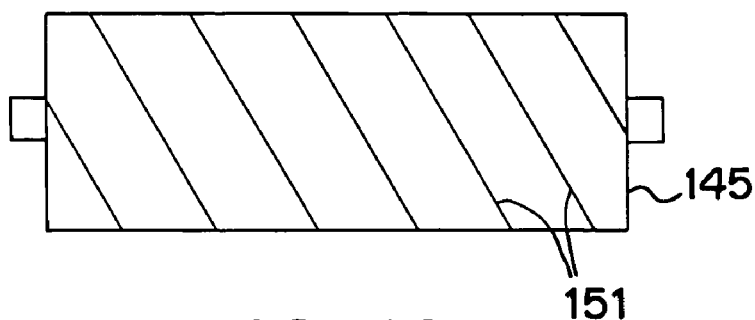
FIG. 10 shows a spiral bond pattern roller suitable for use with the present invention.
Figure 11:
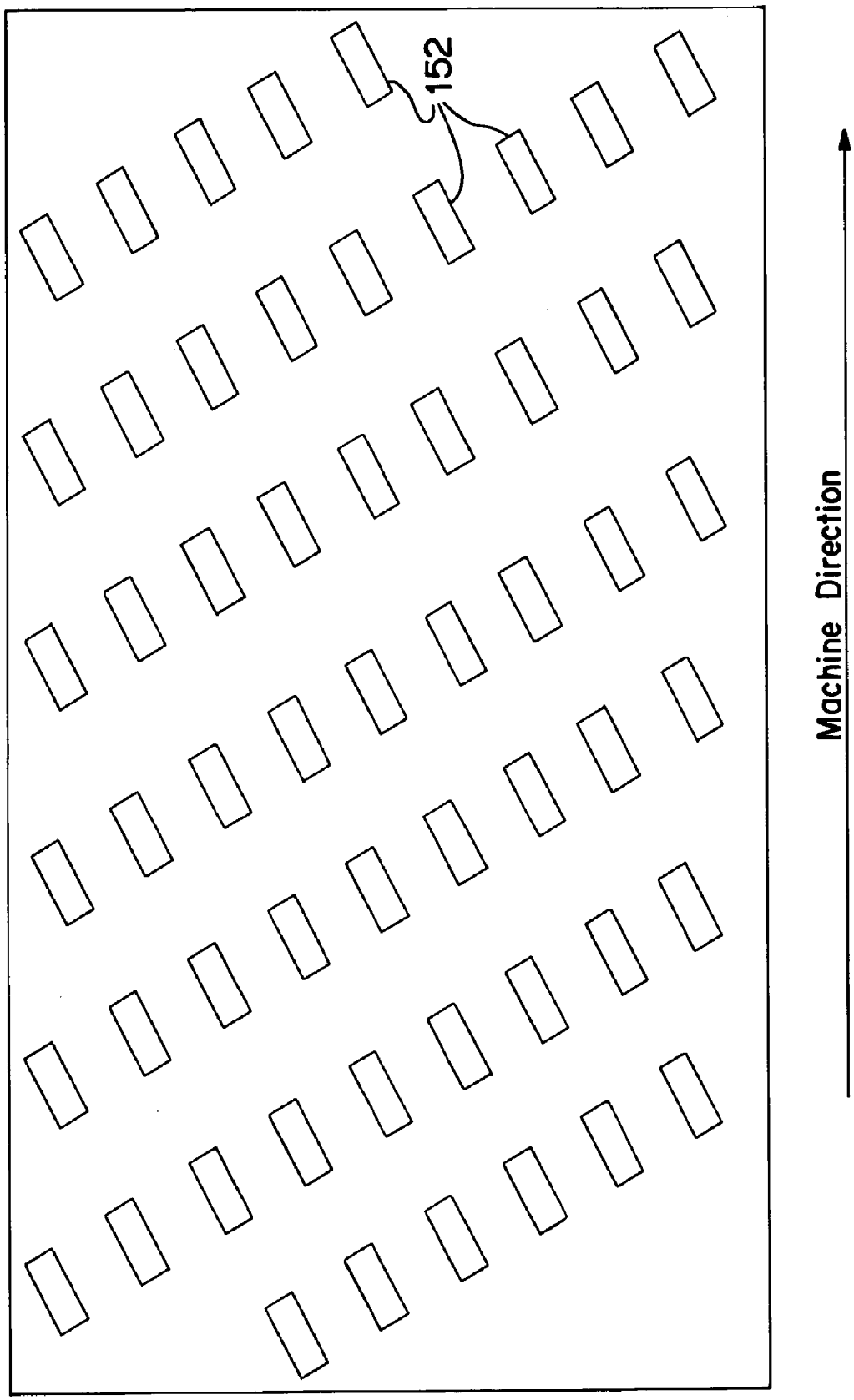
FIG. 11 schematically illustrates a spiral bond pattern resulting from the passing of the web through opposed rollers such as illustrated by FIG. 10.

Also referencing FIGS. 10 and 11, a desirable bonding pattern is that of a pattern having 5% to 10% bond area at 245° F. The spiral pattern of raised lines 151 or points for each calender roll is a mirror image of the complementary calender roll such that the bonded areas of the high loft low density web are a pattern of points where the raised patterns of the calender rolls 145, 147 intersect, as illustrated in FIG. 11. This pattern is desirable in that a minimum of heat and pressure are transferred to the web during calendering. Care should be taken that the specific bond point depth and temperature, bond pattern, and the like, are selected to maintain or achieve the desired loft and density of the material. Without limiting the present invention, it is considered desirable to have not more than a 25% bond area and a low bond point density where a cloth-like feel is to be maintained for the nonwoven web. The fixed and bonded web 149 can then be collected on a winding roll 43 or the like for later use or further processing.

Alternatively, referencing FIG. 3, the high loft, low density nonwoven web 37 maybe pattern bonded without passing the web through a TAB unit (39, FIG. 2). In accordance with one preferred embodiment of this invention, the substantially continuous fibers are bicomponent fibers. Webs of the present invention may contain a single denier structure (i.e., one fiber size) or a mixed denier structure (i.e., a plurality of fiber sizes). As is known, certain bicomponent fibers may be considered to have a "structural component" polymer of higher melting point and an "adhesive component" polymer of lower melting point. Particularly suitable polymers for forming the structural component of suitable bicomponent fibers include polypropylene and copolymers of polypropylene and ethylene, and particularly suitable polymers for the adhesive component of the bicomponent fibers includes polyethylene, more particularly linear low density polyethylene, and high density polyethylene. In addition, the adhesive component may contain additives for enhancing the crimpability and/or lowering the bonding temperature of the fibers, as well as enhancing the abrasion resistance, strength and softness of the resulting webs. A particularly suitable spunbond side by side bicomponent polyethylene/polypropylene fiber for processing according to the present invention is disclosed in U.S. Pat. No. 5,336,552 to Strack et al., as mentioned above. Webs made according to the present invention may further contain fibers having resins alternative to PP/PE, such as, without limitation: PET, Copoly-PP+(about) 3% ethylene, PLA, PTT, Nylon, PBT, etc. Fibers may be of various alternative shapes and symmetries including Pentalobal, Tri-T, Hollow, Ribbon, X, Y, H, and asymmetric cross sections.

Polymers useful in the manufacture of materials according to the present invention may further include thermoplastic polymers like polyolefins, polyesters and polyamides. Elastic polymers may also be used and include block copolymers such as polyurethanes, copolyether esters, polyamide polyether block copolymers, ethylene vinyl acetates (EVA), block copolymers having the general formula A—B—A' or A—B like copoly(styrene/ethylene-butylene), styrene-poly(ethylene-propylene)-styrene, styrene-poly(ethylene-butylene)-styrene, (polystyrene/poly (ethylene-butylene)/polystyrene, poly(styrene/ethylene-butylene/styrene) and the like.

Polyolefins using single site catalysts, sometimes referred to as metallocene catalysts, may also be used. Many polyolefins are available for fiber production, for example polyethylenes such as Dow Chemical's ASPUN® 6811A linear low density polyethylene, 2553 LLDPE and 25355 and 12350 high density polyethylene are such suitable polymers. The polyethylenes have melt flow rates, respectively, of about 26, 40, 25 and 12 at 190° C. and 2.16 Kg force. Fiber forming polypropylenes include ExxonMobil Chemical Company's 3155 polypropylene and Basell Chemical Co.'s PF-304. Many other polyolefins are commercially available.

Biodegradable polymers are also available for fiber production and suitable polymers include polylactic acid (PLA) and a blend of BIONOLLE®, adipic acid and UNITHOX® (BAU). PLA is not a blend but a pure polymer like polypropylene. BAU represents a blend of BIONOLLE®, adipic acid, and UNITHOX® at different percentages. Typically, the blend for staple fiber is 44.1 percent BIONOLLE® 1020, 44.1 percent BIONOLLE® 3020, 9.8 percent adipic acid and 2 percent UNITHOX® 480, though spunbond BAU fibers typically use about 15 percent adipic acid. BIONOLLE® 1020 is polybutylene succinate, BIONOLLE® 3020 is polybutylene succinate adipate copolymer, and UNITHOX® 480 is an ethoxylated alcohol. BIONOLLE® is a trademark of Showa Highpolymer Co. of Japan. UNITHOX® is a trademark of Baker Petrolite which is a subsidiary of Baker Hughes International. It should be noted that some biodegradable polymers are hydrophilic and so are preferably not used for the surface of fluid intake system materials.

Per the above descriptions, the crimpable bicomponent fiber is heated by the HAK 31, hot air diffuser 33 or zoned TAB (not shown) in the first heating zone to a temperature where the polyethylene crystalline regions start to relax their oriented molecular chains and may begin melting. Typical air temperatures used to induce crimp have ranged from about 110-260° F. This temperature range represents temperatures of submelting degree, i.e., above the glass transition temperature ($T_g$) or softening point and below the melting point, which merely relax the molecular chain up through melting temperatures for the polymers. The heat of the air stream from the HAK 31 may be made higher due to the short dwell time of the fibers through its narrow heating zone. Further, when heat is applied to the oriented molecular chains of the fibers, the molecular chain mobility increases. Rather that being oriented, the chains prefer to relax in a random state. Therefore, the chains bend and fold causing additional shrinkage. Heat to the web may be applied by hot air, IR lamp, microwave or any other heat source that can heat the semi-crystalline regions of the polyethylene to relaxation.

Figure 8:
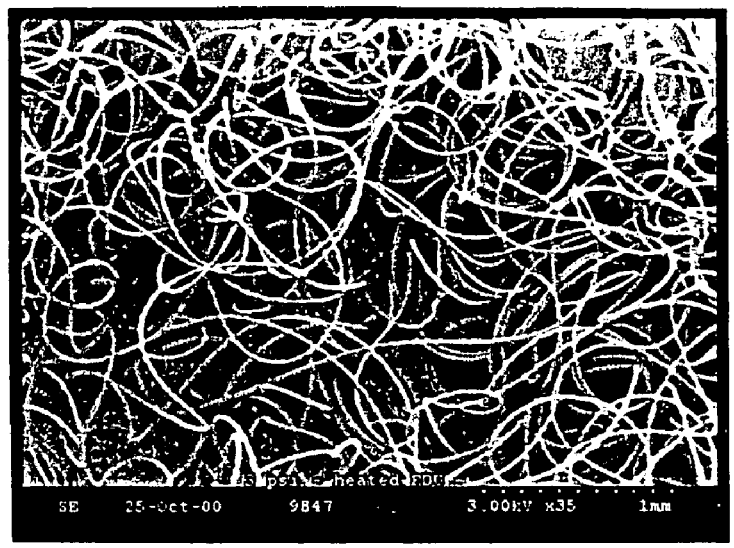
FIG. 8 is a photograph of fibers produced from a known hot FDU exhibiting a typical tight crimp.
Figure 9:
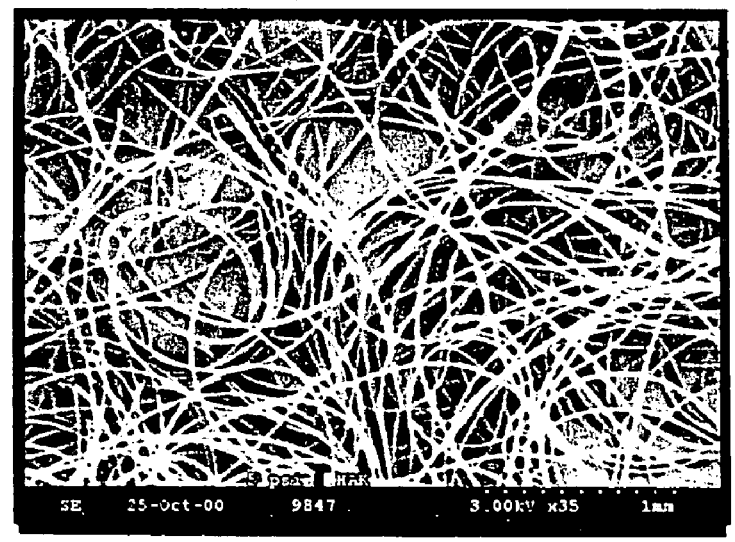
FIG. 9 is a photograph of fibers produced from an ambient non-heated FDU exhibiting a relaxed crimp.

Then the web passes through a cool zone that reduces the temperature of the polymer below its crystallization temperature. Since polyethylene is a semi-crystalline material, the polyethylene chains recrystallize upon cooling causing the polyethylene to shrink. This shrinkage induces a force on one side of the side by side fiber that allows it to crimp or coil if there are no other major forces restricting the fibers from moving freely in any direction. By using the cold FDU, i.e., by not heating the filaments prior to their collection, the fibers are constructed so that they do not crimp in a tight helical fashion normal for fibers processed through a normal hot FDU. Instead, the fibers more loosely and randomly crimp, thereby imparting more Z-direction loft to the fibers. Referencing FIG. 8, there are shown fibers produced from a normal hot FDU exhibiting a typically tight crimp. By comparison, FIG. 9 shows fibers produced from an ambient non-heated FDU exhibiting a much more relaxed macroscopic crimp conducive to a high loft web.

Factors that can affect the amount and type of crimp include the dwell time of the web under the heat of the first heating zone. Other factors affecting crimp can include material properties such as fiber denier, polymer type, cross sectional shape and basis weight. Restricting the fibers with either a vacuum, blowing air, or bonding will also affect the amount of crimp and thus the loft, or bulk, desired to be achieved in the high loft, low density webs of the present invention. Therefore, as the fibers enter the cooling zone, no vacuum is applied to hold the fibers to the forming surface 27 or second wire 35. Blowing air is likewise controlled or eliminated in the cooling zone to the extent practical or desired.

According to one aspect of the present invention, the fibers may be deposited on the forming surface with a high degree of MD orientation as controlled by the amount of under-wire vacuum, the FDU pressure, and the forming height from the FDU to the wire surface. A high degree of MD orientation may be used to induce very high loft into the web, as further explained below. Further, dependent upon certain fiber and processing parameters, the air jet of the FDU will exhibit a natural frequency which may aid in the production of certain morphological characteristics such as shingling effects into the loft of the web.

According to the exemplary embodiment of FIG. 2, wherein the fibers 24 are heated by air flow in the first heating zone and passed by the forming surface 27 to the second wire 35, several crimping mechanisms are believed to take place to aid in the lofting of the fibers, including, without being bound by theory: the below-wire exhaust will cool the web by drawing surrounding air through it which prevents bonding but restricts formation of loft, as the web is transferred out of the vacuum zone to the second wire, the vacuum force is removed and the unconstrained fibers are free to crimp, mechanically, MD surface layer shrinkage of a highly MD oriented surface layer may cause the surface fibers to buckle, mechanical shearing will be induced because the highly MD oriented surface shirring and bonds will leave subsurface fibers to continue shearing thereby creating loft by inducing shingling of the layers, a mechanical buckling pattern may be produced at the natural frequency of the FDU jet which will cause the heated fibers to loft in the same frequency, mechanical forces are created as fibers release from the forming surface 27 when leaving the vacuum area and then are briefly pulled back towards the vacuum unit 29, and a triboelectric (frictional) static charge is built up on the web and causes the fibers to repel each other allowing further loft within the web.

Figure 4:
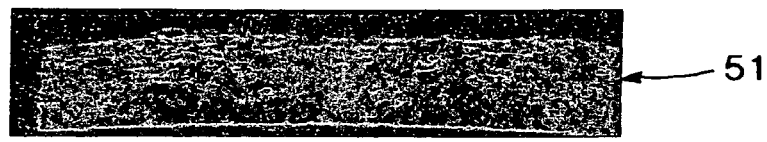
FIG. 4 is a photograph of a side view, or cross section along the machine direction axis, of a high loft, low density nonwoven web having Z-direction components as formed with low machine direction orientation and through air bonding.

Referencing FIG. 4, there is seen a photograph of a side view, or cross section, along the machine direction axis, of a high loft, low density nonwoven web 51 having Z-direction components formed of crimped fibers according to the present invention. The web is formed with low machine direction orientation deposition of fibers onto the forming web and through air bonding to set the web. The crimping forms a random, heterogeneous Z-direction orientation of the fibers. As can be seen, the spaces between the fibers are also randomly distributed and produce irregularly spaced openings. The through air bonding, which involves drawing heated air through the web to fix the web in its high loft state, results in some collapse of the initial loft of the web. The loft of the web is approximately 0.25 inches.

Figure 5:
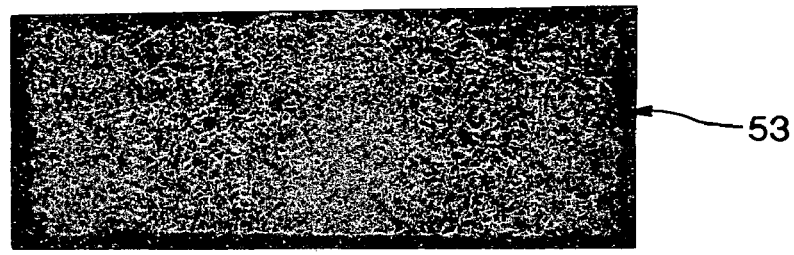
FIG. 5 is a photograph of a side view, or cross section along the machine direction axis, of a high loft, low density nonwoven web having Z-direction components as formed with low machine direction orientation and static air bonding.

Referencing FIG. 5, there is seen a photograph of a side view, or cross section along the machine direction axis, of a very high loft, low density nonwoven web 53 having Z-direction components formed of crimped fibers according to the present invention. The web is formed with low machine direction orientation deposition of fibers onto the forming surface and static air bonding, where the web is undisturbed by drawn or blown air to set the web. By "low machine direction orientation" the person having ordinary skill in the art will understand that the fibers of a low machine direction orientation web are allowed to disperse over the cross direction of the forming surface, e.g. a foraminous wire, to a higher degree than a collection of fibers exhibiting a higher machine direction orientation with less dispersion over the cross direction of the forming surface during the formation of a web. The crimping forms a random, heterogeneous Z-direction orientation of the fibers. As can be seen, the spaces between the fibers are also randomly distributed and produce irregularly spaced openings, with good uniformity of fiber dispersion throughout the web. The static air bonding, which does not involve drawing heated air through the web to fix the web in its high loft state, results in very little to no collapse of the initial loft of the web. The loft of the web is approximately 0.5625 inches. Without being bound by theory, it is believed that good uniformity of fiber distribution is achieved in a web of the present invention because the fibers are unheated and thus uncrimped during formation, i.e. after the fibers are extruded from the die head. This is believed to result in less tangling of the fibers prior to their collection on a forming surface or other gathering means. The uniformity of fiber distribution throughout the web thus results in a uniform fabric with less fiber clumping. On a macroscopic level, the web of the present invention may be distinguished from similar webs made with heated FDUs by the absence of fiber aggregation or clumpings throughout the web. On a close scale, e.g. measured over 2 mm$^2$, the basis weight of a web according to the present invention should thus be rather consistent between any two areas, while a known fabric exhibiting clumping may show disparities in basis weight measurement between two areas of this scale. Over a larger scale of measurement, e.g., 2 inches$^2$, the basis weight of two such fabrics may even out and be comparable. This uniformity may give the web, e.g., faster fluid uptake rates, with more consistent performance, allowing a garment designer to achieve greater control in the performance of the garment.

Figure 6:
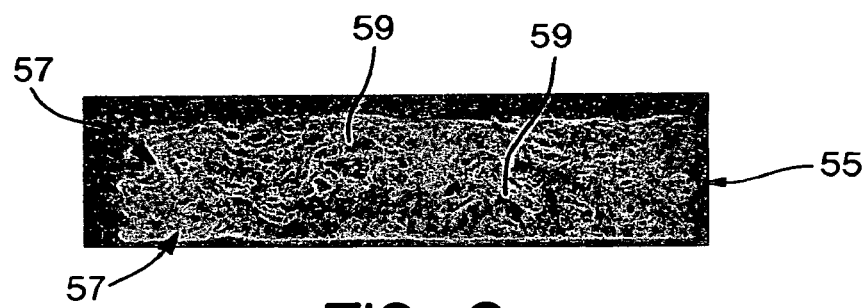
FIG. 6 is a photograph of a side view, or cross section along the machine direction axis, of a high loft, low density nonwoven web having Z-direction components as formed with high machine direction orientation and through air bonding.

Referencing FIG. 6, there is seen a photograph of a side view, or cross section along the machine direction axis, of a high loft, low density nonwoven web 55 having Z-direction components including shingled layers, collectively 57, exhibiting Z-direction buckling, as at 59, at a frequency substantially similar to the natural frequency of the FDU jet and formed of crimped fibers according to the present invention. Shingling, or a shingled layer, is so-called because the web may be layered on itself owing to the overlap of fiber deposition on the forming surface as the jet of fibers coming from the die head oscillates back and forth over the moving collection wire resulting in the laying down of overlapping rows in the manner of shingles. Z-direction buckling may occur where the oscillations of fiber collection result in a Z-direction accumulation of the fibers which then fall towards the X-Y plane of the web resulting in the described shingling. The shingling and buckling thereof may be substantially irregular or random in nature but provide a higher loft and greater open space within the web. The web of FIG. 6 is formed with a higher machine direction orientation deposition of fibers onto the forming web and subsequent through air bonding. The crimping forms a random, heterogeneous Z-direction orientation of the fibers. The through air bonding, which involves drawing heated air through the web to fix the web in its high loft state, results in some collapse of the initial loft of the web. The loft of the web is approximately 0.3125 inches.

Figure 7:
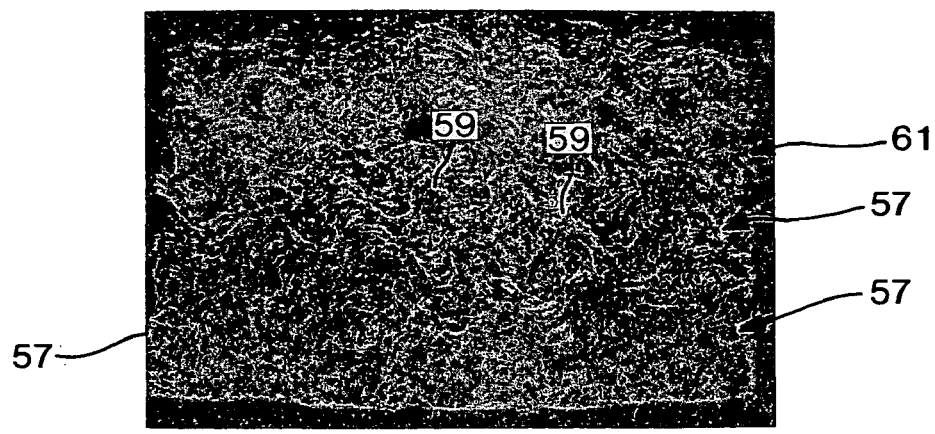
FIG. 7 is a photograph of a side view, or cross section along the machine direction axis, of a high loft, low density nonwoven web having Z-direction components as formed with high machine direction orientation and static air bonding.

Referencing FIG. 7, there is seen a photograph of a side view, or cross section along the machine direction axis, of a very high loft, low density nonwoven web having Z-direction components including shingled layers 57 with Z-direction buckling 59 at a frequency substantially similar to the natural frequency of the FDU jet and formed of crimped fibers according to the present invention. The shingling and buckling thereof can be substantially irregular or random in nature but provide a higher loft and greater open space within the web. The web is formed with higher machine direction orientation deposition of fibers onto the forming web and static air bonding to fix the web in the initially crimped configuration. The crimping forms a random, heterogeneous Z-direction orientation of the fibers. The static air bonding, which does not involve drawing heated air through the web to fix the web in its high loft state, results in little to no collapse of the initial loft of the web. The loft of the web is approximately 1.0 inches.

A high loft low density web was made according to the present invention with 4.5 denier spunbond side by side bicomponent polyethylene/polypropylene fiber at about 0.14 inches loft, about 2.9 osy basis weight and 0.027 g/cc density, and tested for permeability, Fluid Intake and Flowback Evaluation (FIFE) intake, flowback, filtration efficiency, and horizontal wicking. Results were generally superior in each category to a known high capillary bonded carded web at 2.9 osy basis weight, 0.12 inches loft, and 0.032 g/cc density. Efficiency of the web of the present invention, as measured in a penetration test on flow velocity equipment from TSI Incorporated of St. Paul, Minn., generally tested at over 55 percent. Specifically a web of the present invention tested at 3500 darcies permeability, 6 seconds FIFE intake, and 14 grams flowback as opposed to 2500 darcies, 10 seconds, 20 grams, respectively, for the bonded carded web.

Test Methods and Materials

Basis Weight: A circular sample of 3 inches (7.6 cm) diameter is cut and weighed using a balance. Weight is recorded in grams. The weight is divided by the sample area. Five samples are measured and averaged.

Material caliper (thickness): The caliper of a material is a measure of thickness and is measured at 0.05 psi (3.5 g/cm$^2$) with a STARRETT®-type bulk tester, from the L. S. Starrett Company of Athol, Mass., in units of millimeters. Samples are cut into 4 inch by 4 inch (10.2 cm by 10.2 cm) squares and five samples are tested and the results averaged.

Density: The density of the materials is calculated by dividing the weight per unit area of a sample in grams per square meter (gsm) by the material caliper in millimeters (mm). The caliper should be measured at 0.05 psi (3.5 g/cm²) as mentioned above. The result is multiplied by 0.001 to convert the value to grams per cubic centimeter (g/cc). A total of five samples are evaluated and averaged for the density values.

Permeability: Permeability is obtained from a measurement of the resistance by the material to the flow of liquid. A liquid of known viscosity is forced through the material of a given thickness at a constant flow rate and the resistance to flow, measured as a pressure drop is monitored. Darcy's Law is used to determine permeability as follows:

$$\text{Permeability} = [\text{flow rate} \times \text{thickness} \times \text{viscosity} / \text{pressure drop}] \quad [\text{Equation 1}]$$

where the units are:

| permeability: | $cm^2$ or Darcy (1 Darcy = $9.87 \times 10^{-9}$ $cm^2$) |
|---|---|
| flow rate: | cm/sec |
| viscosity: | Pascal-sec |
| pressure drop: | Pascals |

The apparatus consists of an arrangement wherein a piston within a cylinder pushes liquid through the sample to be measured. The sample is clamped between two aluminum cylinders with the cylinders oriented vertically. Both cylinders have an outside diameter of 3.5 inches (8.9 cm), an inside diameter of 2.5 inches (6.35 cm) and a length of about 6 inches (15.2 cm). The 3 inch diameter web sample is held in place by its outer edges and hence is completely contained within the apparatus. The bottom cylinder has a piston that is capable of moving vertically within the cylinder at a constant velocity and is connected to a pressure transducer that is capable of monitoring the pressure encountered by a column of liquid supported by the piston. The transducer is positioned to travel with the piston such that there is no additional pressure measured until the liquid column contacts the sample and is pushed through it. At this point, the additional pressure measured is due to the resistance of the material to liquid flow through it. The piston is moved by a slide assembly that is driven by a stepper motor. The test starts by moving the piston at a constant velocity until the liquid is pushed through the sample. The piston is then halted and the baseline pressure is noted. This corrects for sample buoyancy effects. The movement is then resumed for a time adequate to measure the new pressure. The difference between the two pressures is the pressure due to the resistance of the material to liquid flow and is the pressure drop used in Equation (1). The velocity of the piston is the flow rate. Any liquid of known viscosity can be used, although a liquid that wets the material is preferred since this ensures that saturated flow is achieved. The measurements were carried out using a piston velocity of 20 cm/min, mineral oil (Peneteck Technical Mineral Oil manufactured by Penreco of Los Angeles, Calif.) of a viscosity of 6 centipoise.

Horizontal Wicking: This test measures how far liquid will move in a fabric when only one end of the fabric is immersed in the liquid and the fabric is horizontal. The fabric to be tested is prepared by cutting it into 1 inch (2.5 cm) by 8 inch (20.3 cm) strips in the machine direction. The fabric is compressed to a thickness of 0.06 inches (1.52 mm) by any suitable means. The sample is weighed and marked every 0.5 inch (13 mm) in the long dimension. The sample is placed on a 5 inch (12.7 cm) by 10 inch (25.4 cm) horizontal wire grid and slightly weighted so that it remains flat on the wire. A half inch of one end of the sample is submerged in a 0.5 inch deep by 0.5 inch wide by 5 inch long reservoir containing 10 ml of dyed 8.5 g/l saline solution. The end of the sample in the reservoir is held in place with a cylindrical glass stirring rod having a length of 1.5 inches (3.8 cm) and a diameter of 5/16 inches (7.9 mm) which also is submerged in the saline solution. The sample is allowed to rest with one end submerged in the reservoir for 20 minutes and is then carefully pulled horizontally out of the reservoir, cut at each 0.5 inch mark and each section weighed.

The dry sample weight is subtracted from the wet sample weight to arrive at fluid grams, and the 0.5 inch submerged in the reservoir is not considered. The total distance wicked is recorded along with the total grams of fluid wicked.

NaCl Efficiency: All filtration efficiency data are gathered from NaCl Efficiency testing. The NaCl Efficiency is a measure of the ability of a fabric or web to stop the passage of small particles through it. A higher efficiency is generally more desirable and indicates a greater ability to remove particles. NaCl efficiency is measured in percent according to the TSI Incorporated, Model 8130 Automated Filter Tester Operation Manual at a flow rate of 32 liters per minute using 0.1 micron (elm) sized NaCl particles and is reported as an average of 3 sample readings. The testing manual is available from TSI Inc., Particle Instrument Division, 500 Cardigan Rd, Shoreview, Minn. 55126. This test also can yield a pressure differential across a fabric using the same particle size and airflow rate.

The horizontal Fluid Intake and Flowback Evaluation (FIFE) is performed to determine the intake potential of the composites. The FIFE entails insulting the structure by pouring a defined amount of 0.9 percent saline solution into a cylindrical column resting vertically on top of the structure and recording the time it takes for the fluid to be taken in by the structure. The sample to be tested is placed on a flat surface and the FIFE testing apparatus placed on top of the sample. The FIFE testing apparatus consisted of a rectangular, 35.3 by 20.3 cm, plexiglass piece upon which was centered a cylinder with an inside diameter of 30 mm. The flat piece had a 38 mm hole corresponding with the cylinder so that fluid could pass through it from the cylinder to the sample. The cylinder was centered 2 inches from top or front of the absorbent pad in the crotch of diaper. The FIFE testing apparatus weighed 517 g.

Intake times are typically recorded in seconds. Samples were cut into 2.5 by 7 inch pledgets and were inserted into a STEP 4 HUGGIES ULTRATRIM (TM) commercially available diaper as a surge layer for the diaper. Samples were then insulted three times at 100 ml per insult with a wait of 15 minutes between the time the fluid was completely absorbed and the next insult.

After the third insult, the materials were placed on a vacuum box under 0.5 psi of pressure with a piece of blotter paper on top. The blotter paper was 110 lb. Verigood paper made by Fort James Corporation and was 3.5 by 12 inches (8.9 by 30.5 cm). The blotter paper was weighed before and after the test and the resulting differential reported as the flowback value as grams of fluid desorbed.

Water Vapor Transmission Rate (WVTR)

A suitable technique for determining the WVTR (water vapor transmission rate) value of a film or laminate material of the invention is the test procedure standardized by INDA (Association of the Nonwoven Fabrics Industry), number IST-70.4-99, entitled "*Standard Test Method For Water Vapor Transmission Rate Through Nonwoven And Plastic Film Using A Guard Film And Vapor Pressure Sensor*" which is incorporated by reference herein. The INDA procedure provides for the determination of WVTR, the permeance of the film to water vapor and, for homogeneous materials, water vapor permeability coefficient.

The INDA test method is well known and will not be set forth in detail herein. However, the test procedure is summarized as follows. A dry chamber is separated from a wet chamber of known temperature and humidity by a permanent guard film and the sample material to be tested. The purpose of the guard film is to define a definite air gap and to quiet or still the air in the air gap while the air gap is characterized. The dry chamber, guard film, and the wet chamber make up a diffusion cell in which the test film is sealed. The sample holder is known as the Permatran-W Model 100K manufactured by Mocon/Modern Controls, Inc., Minneapolis, Minn. A first test is made of the WVTR of the guard film and the air gap between an evaporator assembly that generates 100% relative humidity. Water vapor diffuses through the air gap and the guard film and then mixes with a dry gas flow which is proportional to water vapor concentration. The electrical signal is routed to a computer for processing. The computer calculates the transmission rate of the air gap and the guard film and stores the value for further use.

The transmission rate of the guard film and air gap is stored in the computer as CalC. The sample material is then sealed in the test cell. Again, water vapor diffuses through the air gap to the guard film and the test material and then mixes with a dry gas flow that sweeps the test material. Also, again, this mixture is carried to the vapor sensor. The computer than calculates the transmission rate of the combination of the air gap, the guard film, and the test material. This information is then used to calculate the transmission rate at which moisture is transmitted through the test material according to the equation:

$$TR^{-1}_{test\ material} = TR^{-1}_{test\ material,\ guardfilm,\ airgap} - TR^{-1}_{guardfilm,\ airgap}$$

Calculations:

WVTR: The calculation of the WVTR uses the formula:

WVTR=$Fp_{sat}(T)RH/Ap_{sat}(T)(1-RH))$ where:

F=The flow of water vapor in cc/min., $p_{sat}(T)$=The density of water in saturated air at temperature T, RH=The relative humidity at specified locations in the cell, A=The cross sectional area of the cell, and, $p_{sat}(T)$=The saturation vapor pressure of water vapor at temperature T.

Formation Index (Uniformity) test:

The "Formation Index" is measured using a commercially available MK Formation Analyzer model 960, from MK Systems Inc. of Danvers, Massachusetts. Other digital image analysis systems with a minimum pixel density of 512 (horizontal) by 480 (vertical) and 8 bit resolution (giving 256 gray levels) might be used. Alternatively, an image analyzer suitable for the measurement of the Formation Index might be constructed from a "Pentium Class" personal computer containing a video frame grabber card such as the Flashpoint Intrique Pro (manufactured by Integral Technologies Inc. of Indianapolis, Ind.) or equivalent frame grabbers from other vendors. Such personal computer-based systems are most effectively operated using specialized image analysis software available for the different frame grabber cards and construction of an adequate imaging system is considered to be within the skill of the art. Whatever image analysis system is used, a video camera system is used for image input. Either image tube cameras or solid state cameras such as those utilizing Charge Coupled Devices may be used. The camera used to capture the present data was a Sony model XCES-50.

A 35 mm focal length lens is used with the camera. Any high quality lens may be used, such as Navitar 6.1 mm lens (from Navitar Inc. of Rochester, N.Y.). The lens is attached to the camera through suitable adapters. Typically, the lens is operated with its aperture set to f/1.0.

The camera system views a web sample placed on the center of a light box having a diffuser plate. Whatever light box is used, it must have a uniform field of Lambertian (diffuse) illumination of adjustable intensity. The method of intensity adjustment must not change the color temperature of the illumination. One appropriate light box is the Fostec base light model AO-8927.

Specifically, 20 samples for the Formation Index testing are cut from a cross direction width strip of the nonwoven at locations throughout the strip. The samples are 3-inch by 3-inch squares (76 mm$^2$), with one side aligned with the machine direction of the test material. Each specimen is placed on the light box such that the side of the web to be measured for uniformity is facing up, away from the diffuser plate.

The specimen is set on the light box so that the center of the specimen is aligned with the center of the illumination field. All other natural or artificial room light is extinguished. The camera is adjusted so that its optical axis is perpendicular to the plane of the specimen and so that its video field is centered on the center of the specimen. The machine direction of the specimen is aligned with the vertical direction of the camera field. The camera is then positioned along its optical axis until its entire field of view contains exactly three inches of the specimen in the horizontal direction. The camera is focused so that the resulting picture contrast, measured as the standard deviation of the pixel array formed by digitization of the image, is maximized.

The M/K formation index is a measurement of uniformity of formation. The index value is the quotient of the number of pixels in the modal (most common) optical basis weight of pixel light divided by the total number of weight classes observed, divided by a factor of 100 for normalization. The optical basis weights for pixels of the MK Formation Tester range from 0 (a hole in the sample) to 255 (almost no light transmission). The MK Formation Tester has a resolution of 64 different weight classes, each differing by about 1% in basis weight. Each weight class is made up of four optical basis weights. The higher the M/K formation index, the better the formation uniformity. Conversely, the lower the M/K formation index, the worse the formation uniformity.

EXAMPLES

Selected for direct comparison with nonwovens according to the present invention is a nonwoven material of bicomponent spunbond fibers made according to Strack et al. (supra) available from Kimberly-Clark Corporation. Various descriptions of a bicomponent spunbond according to Strack et al. (supra) are taught in U.S. Pat. No. 5,336,552 to Strack et al.; U.S. Pat. No. 5,382,400 or U.S. Pat. No. 5,418,045 to Pike et al., and U.S. Pat. No. 6,436,328 to DiPalma each of which is herein incorporated in its entirety by reference. A bicomponent spunbond according to Strack et al. (supra) is used as a basis to compare the articles and methods of the present invention since a bicomponent spunbond according to Strack et al. (supra) may generally comprise the same or similar components as the fibers of the present invention while being made by different techniques. For example, a bicomponent spunbond according to Strack et al. (supra) utilizes a hot FDU (e.g., 350° F.) to draw the fibers such that the fibers arrive at the collection wire already crimped. The fabrication techniques of a bicomponent spunbond according to Strack et al. (supra), hereinafter "hot FDU bicomponent spunbond," do not utilize the particular steps as taught herein to encourage the production and maintenance of maximum loft of the web. Further, the hot FDU will be recognized by the person having ordinary skill in the art as a limitation on fiber production which the present invention overcomes.

The hot FDU bicomponent spunbond is a nonwoven fabric and generally comprises extruded multicomponent polymeric strands including first and second polymeric components arranged in substantially distinctive zones across the cross-section of the multicomponent strands and extending continuously along the length of the multicomponent strands. Exemplary embodiments are often taught as a 0.5 osy spunbond nonwoven, having fiber denier of approximately 2.0-2.5, and containing approximately 50% Polyethylene and 50% Polypropylene in a side-by-side configuration, with the web having a thermally point bonded structure.

A hot FDU bicomponent spunbond nonwoven fabric is generally made according to a process comprising the steps of melt spinning continuous multicomponent polymeric filaments in an A/B configuration comprising first and second polymeric components, the first and second components being arranged in substantially distinct zones across the cross-section of the multicomponent filaments and extending continuously along the length of the multicomponent filaments, with the second component constituting at least a portion of the peripheral surface of the multicomponent filaments. The first and second components are selected so that the multicomponent filaments are capable of developing latent helical crimp. The multicomponent filaments are drawn with a flow of air contacting the filaments and having a temperature sufficiently high to activate said latent helical crimp. Preferably, the multicomponent filaments are drawn with a fiber draw unit or aspirator by heated air at a temperature sufficient to heat the filaments to a temperature from about 110° F. to a maximum temperature less than the melting point of the lower melting component. However, it should be understood that the appropriate drawing air temperature to achieve the desired degree of crimping will depend on a number of factors including the type of polymers being used and the size of the filaments.

Preferably, the strands are continuous filaments which may be formed by spunbonding techniques. The second component of the strands may include a blend of a polyolefin and an ethylene alkyl acrylate copolymer. Bonds between the multicomponent strands may be formed by the application of heat.

Table 1 gives the values of each test code (i.e., fabric example type) used in comparing the uniformity of nonwovens of the present invention (hereinafter sometimes referred to as "cold FDU bicomponent spunbond") and comparable hot FDU bicomponent spunbond fabrics. Units and measures have been rounded in some instances for ease of presentation and reference may be had to the text below for more exact figures.

TABLE 1

| example code | FDU temp | BASIS WT (in osy) | bulk (in inches) | denier | color | $TiO_2$ % |
|---|---|---|---|---|---|---|
| 1 | 65° F. | 6.0 | 0.50 | 3.3 | white | 2% |
| 2 | " | 2.33 | 0.15 | 3.3 | white | 2% |
| 3 | " | 2.27 | 0.13 | 3.3 | white | 2% |
| 6 | " | 1.5 | 0.09 | 3.3 | white | 2% |
| 7 | " | 1.5 | 0.09 | 2.3 | white | 2% |
| 8 | " | 1.5 | 0.11 | 4.2 | white | 2% |
| 9 | " | 1.5 | 0.10 | 3.2 | white | 0.5% |
| 10 | " | 1.5 | 0.11 | 3.2 | blue | — |
| 11 | " | 1.2 | 0.06 | 3.2 | white | 2% |
| 12 | " | 1.0 | 0.04 | 3.2 | white | 2% |
| 13 | " | 0.77 | 0.03 | 3.2 | white | 2% |
| 14 | 350° F. | 6.0 | 0.35 | 3.2 | white | 2% |
| 15 | " | 2.5 | 0.12 | 3.2 | white | 2% |
| 16 | " | 2.25 | 0.12 | 3.2 | white | 2% |
| 17 | " | 1.5 | 0.1 | 3.2 | white | 2% |
| 18 | " | 1.2 | 0.08 | 3.2 | white | 2% |
| 19 | " | 1.0 | 0.08 | 3.2 | white | 2% |
| 20 | " | 0.75 | 0.07 | 3.2 | white | 2% |

Example 1

Example 1, was produced according to the present invention to a basis weight of 202 gsm (5.96 osy), with a bulk of 12.6 mm (0.5 inch) and density of 0.016 g/cc. The average denier was measured to be approximately 3.3 dpf (denier per fiber). The fibers were side by side bicomponent, featuring polymer A of Dow 61800.41 polyethylene (PE) and polymer B of Exxon 3155 polypropylene (PP). A $TiO_2$ additive from the Standridge Color Corporation, of Social Circle, Ga., tradenamed SCC-4837, was added to the polymer prior to extrusion at 2% by weight to provide white color and opacity to the web. The fibers were spun through a 96 hole per inch (hpi) spinpack, spinning in an A/B side by side (s/s) configuration, at a melt temperature of 410° F.

Throughput was balanced in a 50/50 throughput ratio between the two polymers, with a total throughput of 0.7 grams per hole per minute (ghm). The quench air temperature was 55° F. The fiber spin length was 48 inches. The fibers were drawn at 4.0 pounds/square inch/gram (psig) on bank 1, and 4.5 psig on bank 2, using ambient air of, e.g., approximately 65° F.

The bottom of the fiber draw unit (FDU) was 12 inches above the forming wire, which was moving at 83 f/min, as measured on the forming wire. The hot air knife (HAK) was set at 225° F. and 4.5 inches $H_2O$ of pressure on bank 1, and 218° F. and 4.0 inch $H_2O$ on bank 2, at a height of 5.0 inches above the forming wire. The below wire exhaust under the FDU was set to vacuum of approximately 1.7 inches $H_2O$ in bank 1, and 3.9 inches $H_2O$ in bank 2. The web was bonded at approximately 262-269° F. in a through air bonder (TAB).

Example 2

Example 2, was produced according to the present invention to a basis weight of 79 gsm (2.33 osy), with a bulk of 3.8 mm (0.15 inches) and density of 0.021 g/cc. The average denier was measured to be approximately 3.3 dpf. Polymers and additives were the same as stated for Example 1.

Fiber and web formation conditions were the same as for Example 1 except the forming wire was moving at 220 ft/min, as measured on the forming wire. The HAK was set at 250° F. and 5.0 inches $H_2O$ of pressure on bank 1, and 240° F. and 3.5 inches $H_2O$ at a height of 5.0 inches above the forming wire. The below wire exhaust under the fiber draw unit was set to vacuum of approximately 1.7 inches $H_2O$ in bank 1, and 3.8 inches $H_2O$ in bank 2.

Example 3

Example 3, was produced according to the present invention to a basis weight of 77 gsm (2.27 osy), with a bulk of 3.3 mm (0.13 inch) and density of 0.023 g/cc. The average denier was measured to be approximately 3.3 dpf.

Fiber and web formation conditions were the same as for.Example 1 except the forming wire was moving at 229 ft/min, as measured on the forming wire. The HAK was set at 250° F. and 5.0 inches $H_2O$ of pressure on bank 1, and 240° F. and 3.5 inches $H_2O$ on bank 2, at a height of 5.0 inches above the forming wire. The below wire exhaust under the fiber draw unit was set to vacuum of approximately 1.6 inches $H_2O$ in bank 1, and 3.8 inches $H_2O$ in bank 2. The web was bonded at approximately 262-269° F. in a through air bonder.

Example 6

Example 6, was produced according to the present invention to a basis weight of 52 gsm (1.53 osy), with a bulk of 2.2 mm (0.087 inches) and density of 0.024 g/cc. The average denier was measured to be approximately 3.3 dpf.

Fiber and web formation conditions were the same as for Example 1 except the fibers were drawn at 4.2 psig on bank 1, and 4.2 psig on bank 2. The forming wire was moving at 345 ft/min, as measured on the forming wire. The HAK was set at 253° F. and 3.5 inches $H_2O$ of pressure on bank 1, and 250° F. and 3.7 inches $H_2O$ on bank 2, at a height of 1.0 inches above the forming wire. The below wire exhaust under the fiber draw unit was set to vacuum of approximately 1.6 inches $H_2O$ in bank 1, and 5.2 inches $H_2O$ in bank 2. The web was bonded at approximately 264-265° F. in a through air bonder.

Example 7

Example 7, was produced according to the present invention to a basis weight of 52 gsm (1.53 osy), with a bulk of 2.3 mm (0.091 inches) and density of 0.023 g/cc. The average denier was measured to be approximately 2.3 dpf.

Fiber and web formation conditions were the same as for Example 1 except that the fibers were drawn at 4.8 psig on bank 1, and 4.8 psig on bank 2. The forming wire was moving at 345 ft/min, as measured on the forming wire. The HAK was set at 253° F. and 3.5 inches $H_2O$ of pressure on bank 1, and 250° F. and 3.7 inches $H_2O$ on bank 2, at a height of 1.0 inches above the forming wire. The below wire exhaust under the fiber draw unit was set to vacuum of approximately 1.6 inches $H_2O$ in bank 1, and 5.2 inches $H_2O$ in bank 2. The web was bonded at approximately 264-265° F. in a through air bonder.

Example 8

Example 8 was produced according to the present invention to a basis weight of 51 gsm (1.50 osy), with a bulk of 2.8 mm (0.11 inches) and density of 0.018 g/cc. The average denier was measured to be approximately 4.2 dpf.

Fiber and web formation conditions were the same as for Example 1 except that the fibers were drawn at 3.5 psig on bank 1, and 3.5 psig on bank 2. The forming wire, was moving at 345 ft/min, as measured on the forming wire. The HAK was set at 253° F. and 3.5 inches $H_2O$ of pressure on bank 1, and 250° F. and 3.7 inches $H_2O$ on bank 2, at a height 1.0 inches above the forming wire. The below wire exhaust under the fiber draw unit was set to vacuum of approximately 1.6 inches $H_2O$ in bank 1, and 5.3 inches $H_2O$ in bank 2. The web was bonded at approximately 264-265° F. in a through air bonder.

Example 9

Example 9 was produced according to the present invention to a basis weight of 51 gsm (1.50 osy), with a bulk of 2.5 mm (0.10 inches) and density of 0.021 g/cc. The average denier was measured to be approximately 3.2 dpf.

Fiber and web formation conditions were the same as for Example 1 except that the fibers were drawn at 4.2 psig on bank 1, and 4.2 psig on bank 2, using ambient air of approximately 65° F. The forming wire was moving at 345 ft/min, as measured on the forming wire. The HAK was set at 253° F. and 3.5 inches $H_2O$ of pressure on bank 1, and 250° F. and 3.7 inches $H_2O$ on bank 2, at a height of 1.0 inches above the forming wire. The below wire exhaust under the fiber draw unit was set to vacuum of approximately 1.6 inches $H_2O$ in bank 1, and 5.3 inches $H_2O$ in bank 2. The web was bonded at approximately 265° F. in a through air bonder.

Example 10

Example 10 was produced according to the present invention to a basis weight of 52 gsm (1.53 osy), with a bulk of 2.8 mm (0.11 inches) and density of 0.018 g/cc. The average denier was measured to be approximately 3.2 dpf. An additive tradenamed SCC-3185, from the Standridge Color Corporation, was added to the polymer prior to extrusion at 3.8% by weight to provide blue color to the web.

Fiber and web formation conditions were the same as for Example 1 except that the fibers were drawn at 4.2 psig on bank 1, and 4.2 psig on bank 2, using ambient air of approximately 65° F. The forming wire was moving at 345 ft/min, as measured on the forming wire. The HAK was set at 253° F. and 3.5 inches $H_2O$ of pressure on bank 1, and 250° F. and 3.7 inches $H_2O$ on bank 2, at a height of 1.0 inches above the forming wire. The below wire exhaust under the fiber draw unit was set to vacuum of approximately 1.6 inches $H_2O$ in bank 1, and 5.2 inches $H_2O$ in bank 2. The web was bonded at approximately 264-265° F. in a through air bonder.

Example 11

Example 11, was produced according to the present invention to a basis weight of 41 gsm (1.21 osy), with a bulk of 1.6 mm (0.063 inches) and density of 0.026 g/cc. The average denier was measured to be approximately 3.2 dpf.

Fiber and web formation conditions were the same as for Example 6 except that the forming wire was moving at 430 ft/min, as measured on the forming wire. The HAK was set at 260° F. and 5.0 inches $H_2O$ of pressure on bank 1, and 265° F. and 3.5 inches $H_2O$ on bank 2, at a height of 1.0 inches above the forming wire. The below wire exhaust under the fiber draw unit was set to vacuum of approximately 2.0 inches $H_2O$ in bank 1, and 4.5 inches $H_2O$ in bank 2. The web was bonded at approximately 261-274° F. in a through air bonder.

Example 12

Example 12, was produced according to the present invention to a basis weight of 35 gsm (1.03 osy), with a bulk of 1.1 mm (0.043 inches) and density of 0.032 g/cc. The average denier was measured to be approximately 3.2 dpf.

Fiber and web formation conditions were the same as for Example 6 except that the forming wire was moving at 516 ft/min, as measured on the forming wire. The HAK was set at 270° F. and 8.0 inches $H_2O$ of pressure on bank 1, and 270° F. and 5.0 inches $H_2O$ on bank 2, at a height of 1.0 inches above the forming wire. The below wire exhaust under the fiber draw unit was set to vacuum of approximately 2.0 inches $H_2O$ in bank 1, and 4.5 inches $H_2O$ in bank 2. The web was bonded at approximately 265-277° F. in a through air bonder.

Example 13

Example 13, was produced according to the present invention to a basis weight of 26 gsm (0.77 osy), with a bulk of 0.7 mm (0.028 inches) and density of 0.039 g/cc. The average denier was measured to be approximately 3.2 dpf.

Fiber and web formation conditions were the same as for Example 6 except that the forming wire was moving at 688 ft/min, as measured on the forming wire. The HAK was set at 296° F. and 9.0 inches $H_2O$ of pressure on bank 1, and 287° F. and 12.0 inches $H_2O$ on bank 2, at a height of 1.0 inches above the forming wire. The below wire exhaust under the fiber draw unit was set to vacuum of approximately 2.5 inches $H_2O$ in bank 1, and 4.4 inches $H_2O$ in bank 2. The web was bonded at approximately 265-277° F. in a through air bonder.

Example 14 (Hot FDU Bicomponent Spunbond)

Example 14 was produced according to the above-described hot FDU bicomponent spunbond technology of Strack et al. (supra) to a basis weight of 199 gsm (5.87 osy), with a bulk of 8.9 mm (0.35 inches) and density of 0.022 g/cc. The average denier was measured to be approximately 3.3 dpf.

Fibers were bicomponent, featuring polymer A of Dow 61800.41 PE and polymer B of Exxon 3155 PP. An additive tradenamed SCC-4837 from the Standridge Color Corporation, was added to the polymer prior to extrusion at 2.0% by weight to provide white color and opacity to the web. The fibers were spun through a 96 hpi pack, spinning in a side by side (s/s) configuration, at a melt temperature of 410° F.

Throughput was balanced in a 50/50 throughput ratio between the two polymers, with a total throughput of 0.7 ghm. The quench air temperature was 56° F. The fiber spin length was 48 inches. The fibers were drawn at 4.2 psig on bank 1, and 4.2 psig on bank 2, using heated air of approximately 350° F. The bottom of the FDU was 12 inches above the forming wire, which was moving at 86 ft/min, as measured on the forming wire. The HAK was set at 201° F. and 3.5 inches $H_2O$ of pressure on bank 1, and 206° F. and 3.7 inches $H_2O$ on bank 2, at a height of 1.0 inches above the forming wire. The below wire exhaust under the fiber draw unit was set to vacuum of approximately 5.5 inches $H_2O$ in bank 1, and 6.5 inches $H_2O$ in bank 2. The web was bonded at approximately 254-262° F. in a through air bonder.

Example 15 (Hot FDU Bicomponent Spunbond)

Example 15 was produced according to the above-described hot FDU bicomponent spunbond technology to a basis weight of 86 gsm (2.54 osy), with a bulk of 3.0 mm (0.12 inches) and density of 0.028 g/cc. The average denier was measured to be approximately 3.3 dpf.

Fiber and web formation conditions were the same as for Example 14 except that the forming wire was moving at 200 ft/min, as measured on the forming wire. The HAK was set at 248° F. and 3.5 inches $H_2O$ of pressure on bank 1, and 255° F. and 3.7 inches $H_2O$ on bank 2, at a height of 1.0 inches above the forming wire. The below wire exhaust under the fiber draw unit was set to vacuum of approximately 5.4 inches $H_2O$ in bank 1, and 6.3 inches $H_2O$ in bank 2. The web was bonded at approximately 254-261° F. in a through air bonder.

Example 16 (Hot FDU Bicomponent Spunbond)

Example 16 was produced according to the above-described hot FDU bicomponent spunbond technology to a basis weight of 77 gsm (2.27 osy), with a bulk of 3.1 mm (0.12 inches) and density of 0.024 g/cc. The average denier was measured to be approximately 3.3 dpf.

Fiber and web formation conditions were the same as for Example 14 except that the forming wire was moving at 226 ft/min, as measured on the forming wire. The HAK was set at 248° F. and 3.5 inches $H_2O$ of pressure on bank 1, and 255° F. and 3.7 inches $H_2O$ on bank 2, at a height of 1.0 inches above the forming wire. The below wire exhaust under the fiber draw unit was set to vacuum of approximately 5.4 inches $H_2O$ in bank 1, and 6.3 inches $H_2O$ in bank 2. The web was bonded at approximately 254-262° F. in a through air bonder.

Example 17 (Hot FDU Bicomponent Spunbond)

This example was produced according to the above-described hot FDU bicomponent spunbond technology to a basis weight of 51 gsm (1.50 osy), with a bulk of 2.6 mm (0.10 inches) and density of 0.020 g/cc. The average denier was measured to be approximately 3.2 dpf.

Fiber and web formation conditions were the same as for Example 14 except that the forming wire was moving at 340 ft/min, as measured on the forming wire. The HAK was set at 264° F. and 3.5 inches $H_2O$ of pressure on bank 1, and 259° F. and 3.7 inches $H_2O$ on bank 2, at a height of 1.0 inches above the forming wire. The below wire exhaust under the fiber draw unit was set to vacuum of approximately 5.3 inches $H_2O$ in bank 1, and 6.2 inches $H_2O$ in bank 2. The web was bonded at approximately 255-262° F. in a TAB.

Example 18 (Hot FDU Bicomponent Spunbond)

Example 18, was produced according to the prior art as detailed for hot FDU bicomponent spunbond fiber and fabric to a basis weight of 41 gsm (1.21 osy), with a bulk of 2.0 mm (0.079 inches) and density of 0.021 g/cc. The average denier was measured to be approximately 3.2 dpf.

Fiber and web formation conditions were the same as for Example 14 except that the forming wire was moving at 420 ft/min, as measured on the forming wire. The HAK was set at 268° F. and 3.5 inches $H_2O$ of pressure on bank 1, and 265° F. and 3.7 inches $H_2O$ on bank 2, at a height of 1.0 inches above the forming wire. The below wire exhaust under the fiber draw unit was set to vacuum of approximately 5.3 inches $H_2O$ in bank 1, and 6.2 inches $H_2O$ in bank 2. The web was bonded at approximately 255-262° F. in a through air bonder.

Example 19 (Hot FDU Bicomponent Spunbond)

Example 19, was produced according to the prior art as detailed for hot FDU bicomponent spunbond fiber and fabric to a basis weight of 34 gsm (1.00 osy), with a bulk of 2.0 mm (0.079 inches) and density of 0.017 g/cc. The average denier was measured to be approximately 3.2 dpf.

Fiber and web formation conditions were the same as for Example 14 except that the forming wire was moving at 500 ft/min, as measured on the forming wire. The HAK was set at 277° F. and 3.5 inches $H_2O$ of pressure on bank 1, and 270° F. and 3.7 inches $H_2O$ on bank 2, at a height of 1.0 inches above the forming wire. The below wire exhaust under the fiber draw unit was set to vacuum of approximately 5.3 inches $H_2O$ in bank 1, and 6.2 inches $H_2O$ in bank 2. The web was bonded at approximately 255-267° F. in a through air bonder.

Example 20 (Hot FDU Bicomponent Spunbond)

Example 20, was produced according to the prior art as detailed for hot FDU bicomponent spunbond fiber and fabric to a basis weight of 26 gsm (0.77 osy), with a bulk of 1.8 mm (0.071 inches) and density of 0.015 g/cc. The average denier was measured to be approximately 3.2 dpf.

Fiber and web formation conditions were the same as for Example 14 except that the forming wire was moving at 667 ft/min, as measured on the forming wire. The HAK was set at 300° F. and 3.5 inches $H_2O$ of pressure on bank 1, and 295° F. and 3.7 inches $H_2O$ on bank 2, at a height of 1.0 inches above the forming wire. The below wire exhaust under the fiber draw unit was set to vacuum of approximately 3.2 inches $H_2O$ in bank 1, and 6.2 inches $H_2O$ in bank 2. The web was bonded at approximately 255-266° F. in a through air bonder.

Tables 2 and 3 detail the M/K formation index testing results. Table 2 gives the raw data for each of the Cold FDU example codes of Table 1 as well as the average formation index value and the standard deviation between the samples. Table 3 provides a comparison between the comparable Cold FDU samples and Hot FDU samples of the Table 1. It will be noted that generally the Cold FDU samples of the present invention provide a significant increase in the formation index value, thereby indicating an improved uniformity of fabric over the comparable fabrics made according to the methods of the prior art. While the data is set forth for webs with basis weights between about 0.75 osy and about 6.0 osy, the inventors believe that the trends witnessed in the data will apply to those basis weights in the range of about 0.33 osy to about 12.0 osy. In terms of bulk, while the data is set forth for webs with bulk between about 0.03 inches and 0.50 inches, the inventors believe that the trends witnessed in the data will apply to any comparison of webs with bulk of between about 0.02 to about 1.5 inches. Further, while the data is set forth for webs with fibers having between 2.3 and 4.2 dpf, the inventors believe that the trends witnessed in the data will apply to any comparison of webs between like fiber deniers and especially to those fiber deniers in the range of between about 0.1 dpf to about 9.0 dpf. Also, while the data is set forth for various fiber colors, and especially white fiber colors having between 0.5 and 2.0 percentage of $TiO_2$, the inventors believe that the trends witnessed in the data will apply to any comparison of webs between like fiber colors and especially to those white fiber colors having in the range of between about 0.1 to about 6.0 percent addition of $TiO_2$.

The person having ordinary skill in the art will note that the percentage of difference between the top side formation index and the bottom side formation index is much lower for the webs of the present invention than that of the comparison webs of the known art, thus indicating more uniformity between the major surfaces of the web. Applicants have calculated that the percentage of difference between the surfaces, defined as: highest formation index minus lowest formation index/highest formation index, affords a significantly better uniformity between the major surfaces, i.e. those in the X-Y plane, for webs of the present invention. Without being bound by theory, this may be due to the fact that the fibers of the present invention are deposited on the forming surface, i.e. "wire", while still in an uncrimped state, while the fibers of the comparison webs of the known art are deposited on the wire while crimped. It is believed that the fibers of the present invention therefore lay more uniformly upon deposition, thereby leading to more uniformity between the top and the bottom, or wire side, web surfaces even after the fibers undergo post-deposition crimping. Such webs of the present invention may have increased utility where both sides of the web are visible during later utilization and may further offer benefits in terms of less reliance on presenting the most uniform side of the web during later utilization. It will further be noted that in certain instances, especially in higher bulk or higher basis weight fabrics, that significant differences in the formation index values are not apparent as to one or more sides of the nonwoven. Without being bound by theory, it is speculated that the lack of significant differences in the formation indices may be due at least in part to the nature of light transmission within the subject fabrics which could effect overall M/K test results.

TABLE 2

| M/K Formation Index Rep | code 1 - 6.0 osy cold FDU | | code 2 - 2.5 osy cold FDU | | code 3 - 2.25 osy cold FDU | | code 6 - 1.5 osy cold FDU | | code 7 - 1.5 osy cold FDU, 2.5 dpf | | code 8 - 1.5 osy cold FDU, 4.2 dpf | |
|---|---|---|---|---|---|---|---|---|---|---|---|---|
| | Formation Index Top side | Formation Index Bottom Side | Formation Index Top side | Formation Index Bottom Side | Formation Index Top side | Formation Index Bottom Side | Formation Index Top side | Formation Index Bottom Side | Formation Index Top side | Formation Index Bottom Side | Formation Index Top side | Formation Index Bottom Side |
| 1 | 35.0 | 27.0 | 28.6 | 31.1 | 30.3 | 34.8 | 54.3 | 59.6 | 38 | 43.5 | 29.8 | 29.4 |
| 2 | 25.9 | 46.1 | 33.3 | 36.2 | 36.6 | 30.6 | 49.5 | 54.3 | 43.1 | 47.3 | 40.2 | 34.5 |
| 3 | 36.6 | 36.1 | 31.3 | 38.9 | 38.9 | 33.2 | 40.1 | 65.1 | 57.4 | 50.7 | 41.7 | 42.8 |
| 4 | 39.5 | 25.2 | 37.3 | 28.7 | 33 | 38.4 | 32.4 | 45.8 | 47 | 55.4 | 25.6 | 44.4 |

TABLE 2-continued

| | | | | | | | | | | | | |
|---|---|---|---|---|---|---|---|---|---|---|---|---|
| 5 | 49.9 | 46.9 | 43.3 | 43.3 | 24.6 | 34.4 | 61.9 | 49.3 | 30.7 | 41 | 32.9 | 44.1 |
| 6 | 36.8 | 33.9 | 32.6 | 31.8 | 35.6 | 38.2 | 43.2 | 47.9 | 37.5 | 45.5 | 32.2 | 29.5 |
| 7 | 27.6 | 17.9 | 31.9 | 39.2 | 29.1 | 39.3 | 34.2 | 48.3 | 53.9 | 50 | 33.7 | 40 |
| 8 | 31.2 | 21.4 | 31.4 | 32.4 | 33.8 | 25.4 | 54.5 | 59.6 | 45.6 | 45.3 | 29.5 | 43.8 |
| 9 | 24.5 | 43.0 | 29.9 | 35.2 | 40.9 | 34.5 | 45.7 | 51.6 | 43.6 | 54.8 | 29.2 | 42 |
| 10 | 28.8 | 34.8 | 42 | 39.9 | 44.2 | 42 | 51.1 | 41.1 | 39.1 | 51 | 33.8 | 34.9 |
| 11 | 47.4 | 33.6 | 33.9 | 25.4 | 27 | 29.3 | 44.5 | 49.2 | 48.2 | 44.3 | 33.3 | 41.6 |
| 12 | 34.9 | 26.1 | 28.2 | 36.4 | 41.6 | 34.1 | 43.5 | 36.5 | 45.5 | 49.1 | 29.5 | 45.5 |
| 13 | 30.1 | 29.3 | 36.7 | 40.7 | 38.8 | 34.1 | 53.8 | 52.9 | 39.1 | 55.8 | 38.4 | 39.8 |
| 14 | 30.2 | 25.2 | 29.6 | 34.8 | 36 | 32 | 52 | 52.6 | 58.2 | 49 | 40.7 | 46.6 |
| 15 | 28.4 | 41.2 | 29.2 | 41.7 | 39.8 | 41.1 | 50.3 | 40.8 | 46.7 | 57.8 | 36.5 | 30 |
| 16 | 45.0 | 28.2 | 32.7 | 34.3 | 33.3 | 44.8 | 52.8 | 43 | 55.2 | 50.3 | 39.2 | 40.2 |
| 17 | 23.7 | 28.8 | 35.4 | 30.9 | 40.7 | 40 | 52.4 | 43.2 | 42.2 | 41.9 | 35.4 | 30 |
| 18 | 39.8 | 33.1 | 36.7 | 32.1 | 32.4 | 26.6 | 46.6 | 57.6 | 39.2 | 47.8 | 33.9 | 38.9 |
| 19 | 30.8 | 25.4 | 41.2 | 45.1 | 29.3 | 35.7 | 41.3 | 59.3 | 48 | 40.7 | 44 | 50.5 |
| 20 | 26.9 | 39.6 | 36.6 | 45.5 | 46.2 | 36.8 | 41 | 40.1 | 60.5 | 40.9 | 37.1 | 44.1 |
| Average | 33.65 | 32.14 | 34.09 | 36.18 | 35.605 | 35.265 | 47.255 | 49.89 | 45.935 | 48.105 | 34.83 | 39.63 |
| Std. Dev. | 7.6 | 8.1 | 4.478 | 5.529 | 5.835 | 5.021 | 7.349 | 7.807 | 7.905 | 5.248 | 4.866 | 6.255 |

| M/K Formation Index Rep | code 9 - 1.5 osy cold FDU, 5% TiO2 | | code 10 - 1.5 osy cold FDU, Blue | | code 11 - 1.2 osy cold FDU | | code 12 - 1.0 osy cold FDU | | code 13 - 0.75 osy cold FDU | |
|---|---|---|---|---|---|---|---|---|---|---|
| | Formation Index Top side | Formation Index Bottom Side | Formation Index Top side | Formation Index Bottom Side | Formation Index Top side | Formation Index Bottom Side | Formation Index Top side | Formation Index Bottom Side | Formation Index Top side | Formation Index Bottom Side |
| 1 | 49.4 | 54.6 | 30.1 | 33.9 | 46.5 | 49.7 | 55.8 | 59.6 | 67.7 | 58.3 |
| 2 | 77.7 | 62.5 | 39.4 | 36.9 | 54.3 | 61.9 | 63 | 76.2 | 77.3 | 75.9 |
| 3 | 67.3 | 75.5 | 35.4 | 29.8 | 42.6 | 60.2 | 44.2 | 52.8 | 89.3 | 74.5 |
| 4 | 51.9 | 77.9 | 29.2 | 32.8 | 46.6 | 30.1 | 60.8 | 69.7 | 73.5 | 69.8 |
| 5 | 82 | 74.4 | 40.1 | 33.6 | 52.8 | 50.5 | 65.7 | 70.5 | 78.7 | 72.6 |
| 6 | 64.7 | 69.8 | 26.9 | 39.6 | 54.7 | 43.9 | 57.9 | 60.4 | 73.4 | 73.2 |
| 7 | 58.9 | 65.4 | 23.6 | 34.3 | 44.3 | 50.9 | 66.6 | 66.1 | 68.5 | 63.4 |
| 8 | 64.3 | 62.2 | 30.6 | 39.9 | 43 | 45.9 | 54.5 | 70.4 | 51.1 | 73.2 |
| 9 | 70.7 | 52.4 | 35.4 | 38.3 | 63.5 | 55.2 | 64.2 | 62.6 | 81.1 | 89.2 |
| 10 | 55.9 | 70.1 | 33.6 | 38 | 59 | 48.9 | 49.1 | 64.5 | 85.1 | 70.6 |
| 11 | 70.6 | 58.2 | 37.8 | 30.8 | 45.1 | 49.7 | 60.9 | 67.7 | 64.4 | 65.9 |
| 12 | 77.5 | 69.7 | 31.1 | 35.8 | 53 | 49.6 | 57.2 | 69.3 | 88.6 | 75.8 |
| 13 | 63.3 | 66.9 | 30.3 | 37.1 | 48.4 | 38.8 | 49.1 | 57 | 68.1 | 70.5 |
| 14 | 72.2 | 69.5 | 34.5 | 24.2 | 49.2 | 58 | 73.1 | 75.5 | 63.3 | 67.9 |
| 15 | 63.3 | 69.7 | 30.2 | 28.5 | 45.5 | 44.4 | 65.1 | 60.5 | 87.7 | 79 |
| 16 | 62.2 | 61.2 | 29.9 | 29.4 | 58.9 | 41.9 | 65 | 67.4 | 89.8 | 83.1 |
| 17 | 59.5 | 61.9 | 36.8 | 35.7 | 49.7 | 53 | 64.1 | 62 | 65.4 | 70.4 |
| 18 | 58.8 | 78.5 | 38.2 | 44.7 | 61.4 | 56.2 | 54.6 | 51.1 | 71.8 | 72.5 |
| 19 | 82.3 | 59 | 26.6 | 35.7 | 57.9 | 61 | 71.5 | 74.9 | 70.7 | 69.4 |
| 20 | 56.4 | 68.7 | 34.3 | 39.8 | 54.4 | 54.1 | 51.2 | 49.8 | 63.5 | 61.9 |
| Average | 65.445 | 66.405 | 32.7 | 34.94 | 51.54 | 50.195 | 59.68 | 64.4 | 73.95 | 71.855 |
| Std. Dev. | 9.5 | 7.349 | 4.55 | 4.786 | 6.373 | 7.935 | 7.704 | 7.825 | 10.582 | 7.045 |

TABLE 3

| M/K Formation Index Rep | code 1 - 6.0 osy cold FDU | | code 2 - 2.5 osy cold FDU | | code 3 - 2.25 osy cold FDU | | code 6 - 1.5 osy cold FDU | | code 11 - 1.2 osy cold FDU | | code 12 - 1.0 osy cold FDU | | code 13 - 0.75 osy cold FDU | |
|---|---|---|---|---|---|---|---|---|---|---|---|---|---|---|
| | Formation Index Top side | Formation Index Bottom Side | Formation Index Top side | Formation Index Bottom Side | Formation Index Top side | Formation Index Bottom Side | Formation Index Top side | Formation Index Bottom Side | Formation Index Top side | Formation Index Bottom Side | Formation Index Top side | Formation Index Bottom Side | Formation Index Top side | Formation Index Bottom Side |
| 1 | 35.0 | 27.0 | 28.6 | 31.1 | 30.3 | 34.8 | 54.3 | 59.6 | 46.5 | 49.7 | 55.8 | 59.6 | 67.7 | 58.3 |
| 2 | 25.9 | 46.1 | 33.3 | 36.2 | 36.6 | 30.6 | 49.5 | 54.3 | 54.3 | 61.9 | 63 | 76.2 | 77.3 | 75.9 |
| 3 | 36.6 | 36.1 | 31.3 | 38.9 | 38.9 | 33.2 | 40.1 | 65.1 | 42.6 | 60.2 | 44.2 | 52.8 | 89.3 | 74.5 |
| 4 | 39.5 | 25.2 | 37.3 | 28.7 | 33 | 38.4 | 32.4 | 45.8 | 46.6 | 30.1 | 60.8 | 69.7 | 73.5 | 69.8 |
| 5 | 49.9 | 46.9 | 43.3 | 43.3 | 24.6 | 34.4 | 61.9 | 49.3 | 52.8 | 50.5 | 65.7 | 70.5 | 78.7 | 72.6 |
| 6 | 36.8 | 33.9 | 32.6 | 31.8 | 35.6 | 38.2 | 43.2 | 47.9 | 54.7 | 43.9 | 57.9 | 60.4 | 73.4 | 73.2 |
| 7 | 27.6 | 17.9 | 31.9 | 39.2 | 29.1 | 39.3 | 34.2 | 48.3 | 44.3 | 50.9 | 66.6 | 66.1 | 68.5 | 63.4 |
| 8 | 31.2 | 21.4 | 31.4 | 32.4 | 33.8 | 25.4 | 54.5 | 59.6 | 43 | 45.9 | 54.5 | 70.4 | 51.1 | 73.2 |
| 9 | 24.5 | 43.0 | 29.9 | 35.2 | 40.9 | 34.5 | 45.7 | 51.6 | 63.5 | 55.2 | 64.2 | 62.6 | 81.1 | 89.2 |
| 10 | 28.8 | 34.8 | 42 | 39.9 | 44.2 | 42 | 51.1 | 41.1 | 59 | 48.9 | 49.1 | 64.5 | 85.1 | 70.6 |
| 11 | 47.4 | 33.6 | 33.9 | 25.4 | 27 | 29.3 | 44.5 | 49.2 | 45.1 | 49.7 | 60.9 | 67.7 | 64.4 | 65.9 |

TABLE 3-continued

| | | | | | | | | | | | | | |
|---|---|---|---|---|---|---|---|---|---|---|---|---|---|
| 12 | 34.9 | 26.1 | 28.2 | 36.4 | 41.6 | 34.1 | 43.5 | 36.5 | 53 | 49.6 | 57.2 | 69.3 | 88.6 | 75.8 |
| 13 | 30.1 | 29.3 | 36.7 | 40.7 | 38.8 | 34.1 | 53.8 | 52.9 | 48.4 | 38.8 | 49.1 | 57 | 68.1 | 70.5 |
| 14 | 30.2 | 25.2 | 29.6 | 34.8 | 36 | 32 | 52 | 52.6 | 49.2 | 58 | 73.1 | 75.5 | 63.3 | 67.9 |
| 15 | 28.4 | 41.2 | 29.2 | 41.7 | 39.8 | 41.1 | 50.3 | 40.8 | 45.5 | 44.4 | 65.1 | 60.5 | 87.7 | 79 |
| 16 | 45.0 | 28.2 | 32.7 | 34.3 | 33.3 | 44.8 | 52.8 | 43 | 58.9 | 41.9 | 65 | 67.4 | 89.8 | 83.1 |
| 17 | 23.7 | 28.8 | 35.4 | 30.9 | 40.7 | 40 | 52.4 | 43.2 | 49.7 | 53 | 64.1 | 62 | 65.4 | 70.4 |
| 18 | 39.8 | 33.1 | 36.7 | 32.1 | 32.4 | 26.6 | 46.6 | 57.6 | 61.4 | 56.2 | 54.6 | 51.1 | 71.8 | 72.5 |
| 19 | 30.8 | 25.4 | 41.2 | 45.1 | 29.3 | 35.7 | 41.3 | 59.3 | 57.9 | 61 | 71.5 | 74.9 | 70.7 | 69.4 |
| 20 | 26.9 | 39.6 | 36.6 | 45.5 | 46.2 | 36.8 | 41 | 40.1 | 54.4 | 54.1 | 51.2 | 49.8 | 63.5 | 61.9 |
| Average | 33.65 | 32.14 | 34.09 | 36.18 | 35.605 | 35.265 | 47.255 | 49.89 | 51.54 | 50.195 | 59.68 | 64.4 | 73.95 | 71.855 |
| Std. Dev. | 7.6 | 8.1 | 4.478 | 5.529 | 5.835 | 5.021 | 7.349 | 7.807 | 6.373 | 7.935 | 7.704 | 7.825 | 10.582 | 7.045 |

| | code 14 - 6.0 osy hot FDU | | code 15 - 2.5 osy hot FDU | | code 16 - 2.25 osy hot FDU | | code 17 - 1.5 osy hot FDU | | code 18 - 1.2 osy hot FDU | | code 19 - 1.0 osy hot FDU | | code 20 - 0.75 osy hot FDU | |
|---|---|---|---|---|---|---|---|---|---|---|---|---|---|---|
| M/K Formation Index Rep | Formation Index Top side | Formation Index Bottom Side | Formation Index Top side | Formation Index Bottom Side | Formation Index Top side | Formation Index Bottom Side | Formation Index Top side | Formation Index Bottom Side | Formation Index Top side | Formation Index Bottom Side | Formation Index Top side | Formation Index Bottom Side | Formation Index Top side | Formation Index Bottom Side |
| 1 | 20.5 | 19.8 | 30.9 | 31.8 | 33.6 | 31.3 | 20 | 40.5 | 26.1 | 32.8 | 26 | 41.5 | 23.9 | 37 |
| 2 | 12.2 | 40.3 | 28.3 | 26.1 | 33.1 | 40.6 | 25.5 | 35.9 | 30.5 | 52.7 | 41.1 | 39.7 | 36.7 | 41.4 |
| 3 | 18 | 48.4 | 31.3 | 35.7 | 36.3 | 30.9 | 32 | 40.3 | 39 | 42.5 | 35.4 | 46.5 | 41.8 | 41.1 |
| 4 | 18.8 | 20.7 | 31.7 | 44.7 | 28.9 | 39.3 | 30.9 | 38.8 | 32.8 | 40.7 | 33.8 | 38.9 | 37.8 | 44.4 |
| 5 | 23.4 | 44.9 | 35.6 | 43.1 | 36.1 | 28.9 | 37.2 | 33.7 | 35.5 | 42.8 | 35.4 | 40.2 | 40.1 | 45.3 |
| 6 | 21.1 | 44.1 | 35.5 | 36.2 | 31.3 | 37.2 | 25.7 | 37 | 28.1 | 30.5 | 31.8 | 39.2 | 30 | 37.9 |
| 7 | 21.7 | 29.2 | 31.1 | 39.5 | 30.7 | 37.4 | 27.5 | 26.9 | 24.1 | 28.5 | 27.9 | 37.8 | 30.5 | 43.5 |
| 8 | 16.3 | 26.7 | 34.1 | 35.2 | 22 | 42.1 | 22.7 | 27.7 | 31.9 | 32.2 | 29.7 | 31.7 | 29.6 | 43.7 |
| 9 | 21.1 | 16.2 | 25.5 | 33.8 | 32.8 | 36.3 | 26.8 | 39.8 | 36.7 | 33.6 | 39.8 | 45.3 | 33.6 | 46.8 |
| 10 | 20.2 | 15.7 | 34.3 | 36.6 | 32.8 | 31.4 | 40.5 | 46 | 32.8 | 32.7 | 36 | 43.4 | 49 | 53 |
| 11 | 20.1 | 9.3 | 33.1 | 32.7 | 38.9 | 38.7 | 31.3 | 33.5 | 27.2 | 37.6 | 35.5 | 44.4 | 41.6 | 48.1 |
| 12 | 17.5 | 41.3 | 36.1 | 43 | 33.2 | 37.1 | 28 | 40.8 | 33.2 | 32 | 37.5 | 46.2 | 32.7 | 47.1 |
| 13 | 14.2 | 31.9 | 34.5 | 44.6 | 30.5 | 31.7 | 22.3 | 30.8 | 23.1 | 44.3 | 31.6 | 22.6 | 36.4 | 48 |
| 14 | 10.6 | 34.3 | 33.1 | 38.9 | 17.3 | 36.5 | 23.6 | 31.1 | 25.9 | 25.4 | 32.3 | 32.6 | 44 | 40.8 |
| 15 | 22.8 | 33.9 | 29 | 35 | 30.3 | 24.7 | 24.1 | 26.1 | 28.8 | 35.7 | 36.5 | 36.9 | 38.6 | 36.2 |
| 16 | 25.8 | 38.3 | 27.3 | 35.7 | 22.5 | 33.7 | 30.1 | 33.5 | 41.4 | 38.3 | 32.9 | 37.8 | 47.1 | 44.9 |
| 17 | 23.5 | 25.5 | 35.2 | 36.2 | 34.2 | 36.8 | 28.2 | 39.9 | 33.5 | 50.2 | 41.6 | 54.4 | 44.3 | 46.8 |
| 18 | 14.4 | 40.5 | 38.6 | 37.1 | 20.9 | 33.6 | 34.4 | 32.1 | 34.6 | 41.1 | 45.7 | 33.1 | 42.4 | 50.2 |
| 19 | 20.9 | 39.2 | 31.9 | 42.3 | 32.1 | 37.7 | 36.8 | 39.6 | 24.7 | 40.7 | 36.9 | 29.2 | 33.6 | 43.9 |
| 20 | 18.3 | 31.8 | 23.5 | 33.6 | 27.9 | 34.7 | 26.9 | 33.4 | 31.4 | 28.6 | 25.2 | 38.1 | 38.3 | 35.1 |
| Average | 19.07 | 31.6 | 32.03 | 37.09 | 30.27 | 35.03 | 28.725 | 35.37 | 31.065 | 37.145 | 34.63 | 38.975 | 37.6 | 43.76 |
| Std. Dev. | 3.953 | 10.983 | 3.812 | 4.737 | 5.609 | 4.26 | 5.439 | 5.36 | 5.047 | 7.258 | 5.23 | 7.048 | 6.443 | 4.763 |

The high loft, low density webs according to the present invention are believed to provide excellent fluid handling characteristics such as may be desirable for filtration media, and fluid distribution or absorption layers of absorbent products and may further be suitable for a variety of insulation type fabrics. The person having ordinary skill in the art will recognize that many characteristics of the web may be controlled to produce a variety of high loft, low density morphologies, including, but not limited to, fiber denier, deposition rates, heating and cooling rates, and the amount of forces applied to impede the crimping processes as set forth herein.

Again referencing FIGS. 10 and 11, raised spiral bond lines 151 produce the pattern of bonds 152 of FIG. 11 with a 5% to 10% bond area coverage. The bonds 152 are illustrated schematically as a suitable bonding pattern to be applied by the meeting of mirror image spiral bond lines 151 on the calender rolls 145, 147 during the calender bonding of the fixed web as shown in FIGS. 2 and 3. Other bonding patterns and techniques may also be suitable for use with the present invention. For example, ultrasonic bonding in a suitable distribution may be utilized. In this way, strength may be imparted to the lofty nonwoven allowing it to be utilized in applications such as where tear strength, abrasion resistance, or the general ability to hold together under stress is desired. Such stresses may include the stress of further processing such as may be necessary for further processing of the nonwoven, e.g., in order to apply additional treatments to the nonwoven or incorporate it into a laminate of desired functionality.

Figure 12:
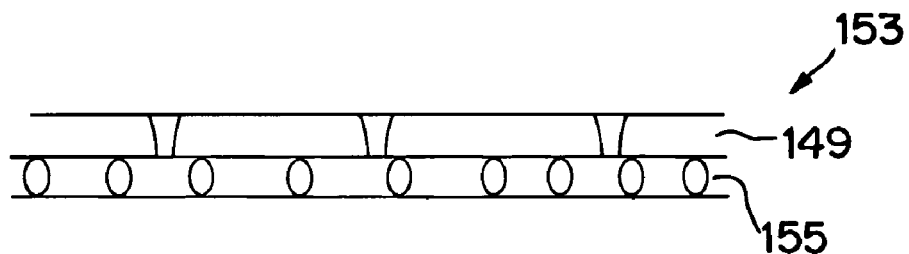
FIG. 12 shows a laminate of a pattern bonded nonwoven and a breathable film.
Figure 18:
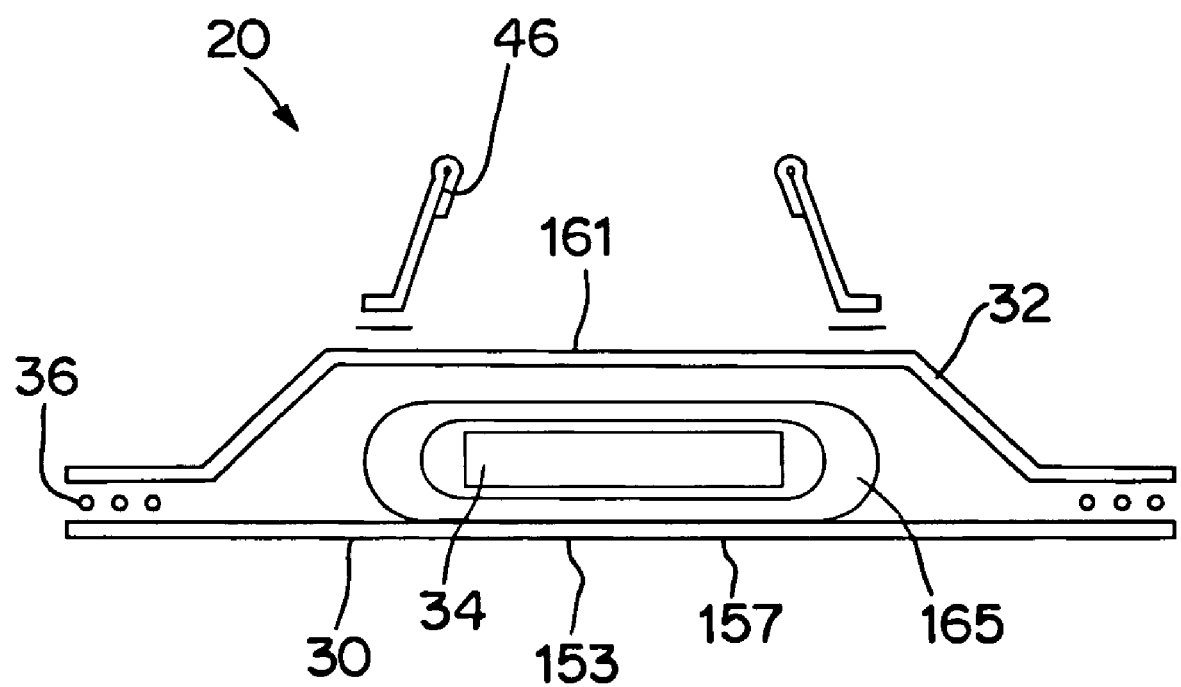
FIG. 18 is a cross section of a diaper showing use of various components therein according to the present invention.

FIG. 12 illustrates one such laminate 153 wherein the bonded nonwoven 149 is laminated to a breathable, liquid barrier film 155 such as a $CaCO_3$ filled, 0.5 osy, stretched film such as known per se in the art. Such a laminate 153 may provide an outer cover 30 with an integral spacer layer for separation from an overlaying absorbent core in the context of an absorbent garment 20 as shown in FIG. 18.

Figure 13:
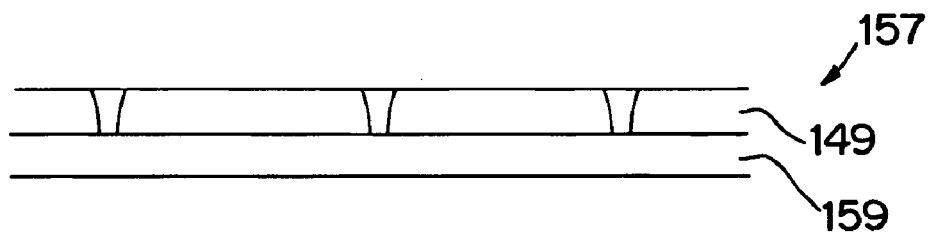
FIGS. 13-15 shows a laminate of the pattern bonded nonwoven and an elastic film, elastic filaments and elastic nonwoven, respectively.

FIG. 13 illustrates a laminate 157 wherein the bonded nonwoven 149 is laminated to an elastic film substrate 159 such as known in the art, e.g., HYTREL® elastomers from E. I. DuPont de Nemours & Co. to impart elastic retraction to the resultant laminate. Such a laminate 157 may provide an outer cover 30 with elastic properties in one or more axes thus providing an improved fit against the wearer in the context of an absorbent garment 20 as shown in FIG. 18.

Figure 14:
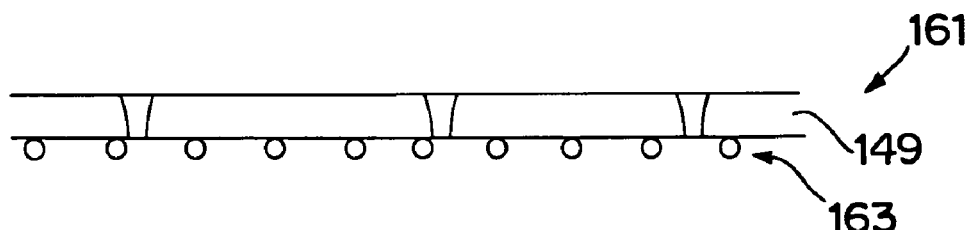

FIG. 14 illustrates a laminate 161 wherein the bonded nonwoven 149 is laminated to an elastic substrate of filaments 163 such as known in the art, e.g., elastic fibers such as those known under the tradename LYCRA M Elastic Fibers from E. I. DuPont de Nemours & Co., extending, e.g., in the machine direction, to impart elastic retraction to the resultant laminate. Such a laminate 161 may provide a fluid transfer layer with elastic properties in one or more axes, such as may be used for a liner or topsheet 32 or adjacent surge layer, or a combination thereof, thus providing an improved fit against the wearer in the context of an absorbent garment 20 as shown in FIG. 18.

Figure 15:
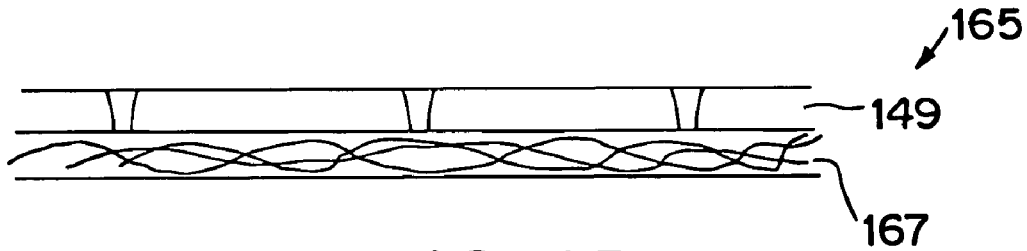

FIG. 15 illustrates a laminate 165 wherein the bonded nonwoven 149 is laminated to an elastic nonwoven substrate 167 such as known in the art, e.g. made from elastomeric fibers of styrenic block copolymers, e.g., those trade-named KRATON available from Kraton Polymers of Houston, Tex., to impart elastic retraction to the resultant laminate. Such a laminate 165 may provide a fluid transfer layer with elastic properties such as may be suitable for a wrapping fabric for an absorbent core 34, as shown in FIG. 18, to provide extensibility in the context of an absorbent garment 20.

It may further be desirable to provide the elastic substrates of FIGS. 13-15 as materials which are tensioned during the lamination process to the nonwoven but without sufficient tension to gather the nonwoven, in order to keep the laminate flat for ease of additional processing. The laminate may then be caused to retract by the further application of heat. Such an arrangement may be particularly suited to provide elasticized cuff or other marginal areas to, e.g., a diaper made from a material according to the present invention. It will be appreciated that the laminates according to the present invention are not limited to two material layers as shown in the figures. Further the laminates of the present invention may utilize any suitable method of bonding the two or more layers of the desired laminate together, including adhesives, co-extrusion, further thermal lamination, or the like. It will also be appreciated that lamination of the lofty low density nonwoven is not limited to elastic layers. The lofty low density nonwoven may equally well be laminated to other nonwovens, or combinations of nonwovens, such as a known thermoplastic nonwoven topsheet material, an extensible or elastic laminate of two or more nonwovens, or the like to achieve dual functionalities and synergies within a single laminate which can be easily placed in the garment manufacturing process, such as a combined topsheet and liquid intake, or surge, layer.

Figure 16:
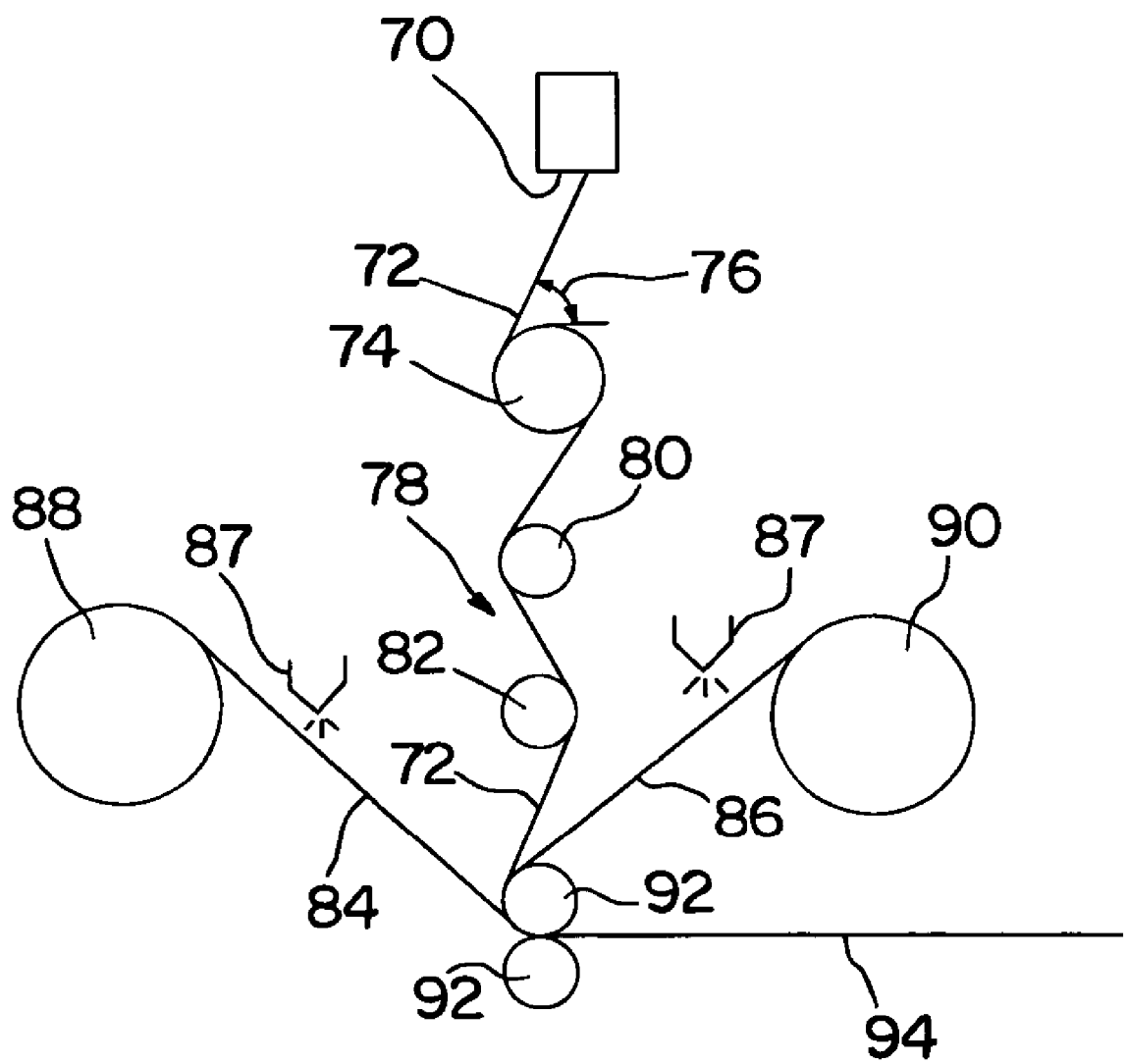
FIGS. 16-17 show alternative stretch bond lamination processes of a vertical nature and a horizontal nature, respectively.

FIG. 16 schematically illustrates a vertical filament laminate (VFL) process for the manufacture of elastic laminates as previously mentioned above. Referring to FIG. 16, at least one molten elastomeric material, e.g. styrenic block copolymer, is extruded from a die extruder 70 through spinning holes as a plurality of substantially continuous elastomeric filaments 72. A film die for producing sheets or ribbons may also be used in alternative embodiments. The filaments 72 are quenched and solidified by passing the filaments 72 over a first chill roll 74. Any number of chill rolls can be used. Suitably, chill rolls may have a temperature of about 40 degrees F. to about 80 degrees F.

The die of the extruder 70 may be positioned with respect to the first roller so that the continuous filaments meet this first roller 74 at a predetermined angle 76. This strand extrusion geometry is particularly advantageous for depositing a melt extrudate onto a rotating roll or drum. An angled, or canted, orientation provides an opportunity for the filaments to emerge from the die at a right angle to the roll tangent point resulting in improved spinning, more efficient energy transfer, and generally longer die life. This configuration allows the filaments to emerge at an angle from the die and follow a relatively straight path to contact the tangent point on the roll surface. The angle 76 between the die exit of the extruder 70 and the vertical axis (or the horizontal axis of the first roller, depending on which angle is measured) may be as little as a few degrees or as much as 90 degrees.

For example, a 90 degree extrudate exit to roller angle could be achieved by positioning the extruder 70 directly above the downstream edge of the first roller 74 and having a side exit die tip on the extruder. Moreover, angles such as about 20 degrees, about 35 degrees, or about 45 degrees, away from vertical may be utilized. It has been found that, when utilizing a 12-filament/inch spinplate hole density, an approximately 45 degree angle (shown in FIG. 16) allows the system to operate effectively. The optimum angle, however, may vary as a function of extrudate exit velocity, roller speed, vertical distance from the die to the roller, and horizontal distance from the die centerline to the top dead center of the roller. Optimal performance can be achieved by employing various geometries to result in improved spinning efficiency and reduced filament breakage.

After the filaments 72 are quenched and solidified they are stretched or elongated using a first series of stretch rolls 78. The first series of stretch rolls 78 may comprise one or more individual stretch rolls and suitably at least two stretch rolls 80 and 82, as shown in FIG. 16. Stretch rolls 80, 82 rotate at a speed greater than a speed at which chill roll 74 rotates, thereby stretching the filaments 72.

In one embodiment of this invention, each successive roll rotates at a speed greater than the speed of the previous roll. For example, referring to FIG. 16, if the chill roll 74 rotates at a speed "x"; stretch roll 80 rotates at a still greater speed, for example about 1.15x; second stretch roll 82 rotates at a still greater speed, for example about 1.25x to about 7x. As a result, the filaments 72 may be stretched by about 100% to about 800% of an initial pre-stretched length.

After the filaments 72 are stretched, they are laminated to the first facing material 84 and optionally at the same time to a second facing material 86, typically by an adhesive process. The first facing material 84 is unwound from a roller 88 and laminated to a first side of the filaments 72. The second facing material 86 is unwound from a second roller 90 and laminated to a second side of the filaments 72. The adhesive process is exemplified by the illustrated adhesive distribution units, collectively 87, shown as applying adhesive to the facing materials 84, 86. Before the facing materials 84, 86 are laminated to the filaments they may be necked by additional rollers (not shown). One or more of the facing materials may be the lofty low density nonwoven material, or laminates thereof, according to the present invention. The laminate material is then passed through nip rolls 92 to bond the elastic filaments to the facings 84, 86 by adhesion. The nip rolls 92, may alternatively be used in place of, or in addition to, the stretch rolls 80, 82 to achieve stretching. The laminate material is then allowed to relax thereby allowing the retracting elastomeric filaments to form gathers in the material The nip rollers may be designed to provide a patterned roller which may yield certain benefits such as increased bulk or stretching of the laminate and may be used where the strength of the contact adhesion between and among the facings and the strands is not unduly effected. The calender rolls can be heated to a degree below the melting points of the various laminate components, or may be ambient, or chilled.

Figure 17:
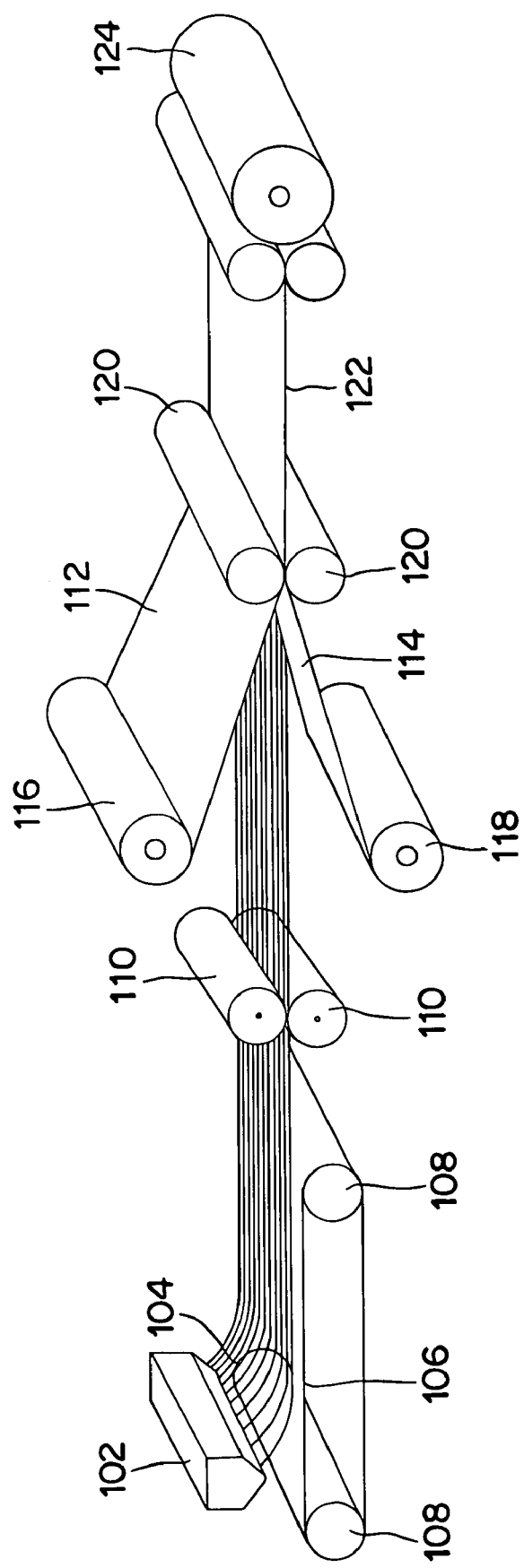

FIG. 17 illustrates a horizontal, continuous filament laminate (CFL) process for making another elastic laminate of the invention. A first extrusion apparatus 102 is fed with an elastomeric polymer or polymer blend from one or more sources (not shown) which is extruded onto a forming surface 106 in filament form. In various embodiments, the extrusion apparatus 102, or a second extrusion apparatus (not shown), can be configured to produce other materials, e.g. thermoplastic fibers, to achieve the inline placement of layers of different materials. Techniques for fiber extrusion, such as modified meltblowing of the fibers, are further set forth in the previously mentioned U.S. Pat. No. 5,385,775 to Wright. Apparatus 102 extrudes filaments 104 directly onto a conveyor system, which can be a forming surface system 106 (e.g., a foraminous belt) moving clockwise about rollers 108. A vacuum (not shown) can also help hold the filaments 104 against the foraminous wire system.

The filaments 104 are then stretched by tensioning rollers 110 to elongate and tension the filaments. Desirably the tension rollers 110 are provided with a surface having little to no affinity for the filaments 104.

After the filaments 104 are stretched, they are laminated to the first facing material 112 and desirably at the same time to a second facing material 114. One or both of the facing materials may be the lofty low density nonwoven material, or laminates thereof, according to the present invention. The first facing material 112 is unwound from a roller 116 and laminated to a first side of the filaments 104. The second facing material 114 is unwound from a second roller 118 and laminated to a second side of the filaments 104. Before the facing materials 112, 114 are laminated to the filaments 104 the facing materials may also be stretched by additional rollers (not shown). The laminate material is then passed through nip rolls 120 to bond the elastic filaments to the facings 112, 114 to produce the elastic laminate 122. The elastic laminate 122 is then allowed to relax, forming gathers therein and is collected on a collection roll 124 for further use.

As in the VFL process, the nip rollers 120 may be desirably designed to provide a 100% bond area through the use of flat calender rolls or may provide a patterned bond area. The rollers 120 can be heated to a degree below the melting points of the various laminate components, or may be ambient, or chilled.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for producing a high loft, low density nonwoven web, the nonwoven web having X, Y and Z dimensions, with the X dimension being in a machine direction, the Y dimension being in a cross machine direction and the Z dimension being in a loft direction, comprising, in order:
   a) forming a group of crimpable, substantially continuous, spunbond, bicomponent fibers of A/B configuration and depositing the group of fibers onto a forming surface without the addition of heat to the fibers before deposition;
   b) first heating the fibers at a time and a temperature sufficient to induce a relaxation of molecular orientation of one side of the fiber while controlling or minimizing the forces which tend to impede crimping of the fibers whereby the fibers are allowed to crimp in the Z-direction with no more than a non-functional bonding of the fibers;
   c) after the first heating, cooling the group of fibers below the temperature where the fibers will bond to each other and thereby inducing the fibers to crimp while controlling or minimizing the forces which tend to impede crimping of the fibers whereby the fibers are allowed to crimp in the Z-direction to produce the high loft, low density nonwoven web on a forming wire, the nonwoven web having a top side, a top side formation index, a wire side, and a wire side formation index such that the top side formation index differs from the wire side formation index by less than about 11%; and
   d) bonding the crimped fibers of the high loft, low density nonwoven web in a manner to substantially maintain its high loft using a pattern of point bonds covering not more than 25% of an area of the nonwoven web.

2. The method according to claim 1 further comprising the step of placing the high loft, low density nonwoven web on a transportation sheet before pattern bonding.

3. The method according to claim 1 wherein the pattern bonding is a 5% to 10% surface area pattern bonding.

4. The method according to claim 3 wherein the pattern bonding is a spiral bond.

5. The method according to claim 1 wherein the high loft, low density nonwoven web has a basis weight of less than or equal to 1.5 osy (50 gsm).

6. The method according to claim 1 further comprising: treating the high loft, low density nonwoven web with a surfactant selected to improve the hydrophilicity thereof.

7. The method according to claim 1 further comprising: bonding at least one XY planar surface of the high loft, low density nonwoven web to a liquid barrier substrate.

8. The method according to claim 7 wherein the liquid barrier substrate is breathable.

9. The method according to claim 8 wherein the breathable liquid barrier substrate is a microporous film.

10. The method according to claim 1 further comprising: bonding at least one XY planar surface of the high loft, low density nonwoven web to an expandable substrate.

11. The method of claim 10 wherein the expandable substrate is elastic.

12. The method according to claim 10 wherein the expandable substrate comprises filaments.

13. The method according to claim 10 wherein the expandable substrate comprises a nonwoven web.

14. The method according to claim 10 wherein the expandable substrate comprises a film.

15. The method according to claim 11 wherein the expandable substrate comprises filaments.

16. The method according to claim 11 wherein the expandable substrate comprises a web.

17. The method according to claim 11 wherein the expandable substrate comprises a film.

18. The method of claim 10 wherein the expandable substrate is retractable upon the application of heat.

19. The method of claim 1, wherein the fibers have a fiber denier of between about 0.1 dpf to about 9.0 dpf.

20. The method of claim 1, wherein the fibers have a fiber denier of between about 0.1 dpf to about 5.0 dpf.

21. The method of claim 1, wherein the fibers have a fiber denier of between about 0.1 dpf to about 3.3 dpf.

22. The method of claim 1, wherein the fibers have a fiber denier of between about 3.4 dpf to about 4.2 dpf.

23. The method of claim 1, wherein the fibers have a $TiO_2$ percentage of about 0.1% to about 5%.

24. The method of claim 1, wherein the fibers of the nonwoven web are integrally bonded.

* * * * *

UNITED STATES PATENT AND TRADEMARK OFFICE
CERTIFICATE OF CORRECTION

| | | |
|---|---|---|
| PATENT NO. | : 7,258,758 B2 | Page 1 of 1 |
| APPLICATION NO. | : 10/749461 | |
| DATED | : August 21, 2007 | |
| INVENTOR(S) | : L. Warren Collier, IV et al. | |

It is certified that error appears in the above-identified patent and that said Letters Patent is hereby corrected as shown below:

On Title page 1, in Inventors Item 75, "Warren L. Collier, IV" should be changed to --L. Warren Collier IV--.

Signed and Sealed this

Twentieth Day of November, 2007

JON W. DUDAS
*Director of the United States Patent and Trademark Office*